US008253872B2

(12) United States Patent
Ina et al.

(10) Patent No.: US 8,253,872 B2
(45) Date of Patent: Aug. 28, 2012

(54) LIQUID CRYSTAL DISPLAY DEVICE HAVING SOURCE-DRAIN PARASITIC CAPACITANCES OF A DELTA ARRANGEMENT

(75) Inventors: Keiichi Ina, Sumida-ku (JP); Ichiro Shiraki, Tenri (JP); Mutsumi Nakajima, Nara (JP); Keisuke Yoshida, Yamatokoriyama (JP); Shoichi Andou, Matsusaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 937 days.

(21) Appl. No.: 11/042,545

(22) Filed: Jan. 26, 2005

(65) Prior Publication Data

US 2005/0168665 A1 Aug. 4, 2005

(30) Foreign Application Priority Data

Jan. 29, 2004 (JP) ................................ 2004-022152
Jan. 29, 2004 (JP) ................................ 2004-022167

(51) Int. Cl.
G02F 1/1343 (2006.01)
G02F 1/136 (2006.01)
(52) U.S. Cl. ................................ 349/38; 349/42; 349/43
(58) Field of Classification Search ............... 349/38, 349/39, 42, 43
See application file for complete search history.

(56) References Cited

U.S. PATENT DOCUMENTS

| | | | |
|---|---|---|---|
| 5,144,288 A | 9/1992 | Hamada et al. | |
| 5,459,595 A | 10/1995 | Ishiguro et al. | |
| 5,459,596 A | 10/1995 | Ueda et al. | |
| 5,600,461 A | 2/1997 | Ueda et al. | |
| 5,659,375 A * | 8/1997 | Yamashita et al. | 349/38 |
| 5,786,876 A | 7/1998 | Ota et al. | |
| 5,822,026 A * | 10/1998 | Matsuo | 349/38 |
| 5,946,058 A | 8/1999 | Kamada et al. | |
| 5,953,088 A | 9/1999 | Hanazawa et al. | |
| 5,966,189 A | 10/1999 | Matsuo | |
| 5,986,723 A | 11/1999 | Nakamura et al. | |
| 6,040,886 A | 3/2000 | Ota et al. | |
| 6,172,729 B1 | 1/2001 | Ikeda | |
| 6,400,427 B1 | 6/2002 | Hanazawa et al. | |
| 6,414,729 B1 | 7/2002 | Akiyama et al. | |
| 6,507,375 B1 | 1/2003 | Kawahata | |
| 6,563,561 B1 | 5/2003 | Ota et al. | |
| 6,587,165 B2 | 7/2003 | Hashimoto et al. | |
| 6,674,499 B2 | 1/2004 | Nakamura | |

(Continued)

FOREIGN PATENT DOCUMENTS

CN 1338658 A 3/2002

(Continued)

OTHER PUBLICATIONS

U.S. Appl. No. 11/047,820, filed Feb. 2, 2005.

(Continued)

Primary Examiner — Lauren Nguyen
(74) Attorney, Agent, or Firm — Nixon & Vanderhye P.C.

(57) ABSTRACT

A shield electrode is provided in the vicinity of a pixel electrode and source bus lines. The shield electrode may be provided in the same layer as gate bus lines, or in the same layer as the source bus lines. The shield electrode may be surrounded by an insulating material, or may be connected to a line other than the source bus lines. By providing the shield electrode, it is possible to reduce a source-drain parasitic capacitance between a pixel electrode and a source bus line.

14 Claims, 31 Drawing Sheets

U.S. PATENT DOCUMENTS

| | | |
|---|---|---|
| 2002/0057391 A1 | 5/2002 | Nakamura |
| 2002/0149729 A1 | 10/2002 | Nishimura et al. |
| 2002/0171086 A1 | 11/2002 | Miyajima et al. |
| 2003/0002001 A1 | 1/2003 | Ota et al. |
| 2005/0168678 A1 | 8/2005 | Andou et al. |

FOREIGN PATENT DOCUMENTS

| | | |
|---|---|---|
| CN | 1363854 A | 8/2002 |
| JP | 61-50183 | 3/1986 |
| JP | 5-127195 A | 5/1993 |
| JP | 06-342156 | 12/1994 |
| JP | 07-209669 | 8/1995 |
| JP | 10-90702 A | 4/1998 |
| JP | 2000-206560 A | 7/2000 |
| JP | 2001-092378 | 4/2001 |
| JP | 2001-318390 A | 11/2001 |
| JP | 2002-318389 A | 10/2002 |
| JP | 2004-133028 | 4/2004 |
| KR | 1999-0080392 A | 11/1999 |
| KR | 2001-0007405 A | 1/2001 |
| KR | 2003-0016017 A | 2/2003 |

OTHER PUBLICATIONS

JP 2002-297058 (corresponds to the U.S. counterpart application listed above).

* cited by examiner

LIQUID CRYSTAL DISPLAY DEVICE HAVING SOURCE-DRAIN PARASITIC CAPACITANCES OF A DELTA ARRANGEMENT

This nonprovisional application claims priority under 35 U.S.C. § 119(a) on Patent Application No. 2004/022152 filed in Japan on Jan. 29, 2004, and Patent Application No. 2004/022167 filed in Japan on Jan. 29, 2004. The entire contents of these applications are hereby incorporated by reference.

FIELD OF THE INVENTION

The present invention relates to display devices, such as liquid crystal display devices.

BACKGROUND OF THE INVENTION

Display devices, such as liquid crystal display devices, are used in order to display various information. As shown in FIGS. 37 and 40, for example, a display device includes a gate bus line, a source bus line, an auxiliary capacitance line, a pixel electrode, and an opposed electrode. The pixel electrode is provided within a region surrounded by the gate bus line and the source bus line and provided so as to overlap with the source bus line, in order to receive a data signal from the source bus line. The opposed electrode is opposed to the pixel electrode.

Examples of such display devices are disclosed, for example, in U.S. Pat. No. 5,946,058 (date of patent: Aug. 31, 1999) and United States Patent Publication No. 2002/0057391A1 (date of publication: May 16, 2002).

According to the conventional arrangement, as shown in FIG. 39, a source-drain parasitic capacitance (hereinafter occasionally referred to by abbreviation "Csd") is formed at each position where a pixel electrode 21 and a source bus line 18 overlap. The source-drain parasitic capacitance is undesirable, because it can cause vertical crosstalk and flicker. In FIG. 39, the black arrow indicates application of data signal.

According to the conventional arrangement, as shown in FIG. 42, a source-drain parasitic capacitance (hereinafter occasionally referred to by abbreviation "Csd") is formed at each position where a pixel electrode and a source bus line overlap. Through this capacitance, the potential of the pixel is attracted when the potential of the source bus line fluctuates. Since the amount of attracted pixel potential is different with respect to each horizontal line, the difference in the amount of attracted pixel potential appears as a difference in luminance (=horizontal stripes). As a result, even display cannot be attained. In FIG. 42, the black arrow indicates application of data signal, and the white arrow indicates a potential attraction effect with respect to G(green)-pixels.

The following specifically discusses how the horizontal stripes are generated.

FIG. 42 is a schematic diagram illustrating source bus lines, pixel electrodes, and source-drain parasitic capacitances of a delta arrangement display panel.

Here, attention is paid to a G-pixel, for example. As shown in FIG. 42, the G-pixel is adjacent to a source bus line for a G-signal and a source bus line for an R-signal or a B-signal. Whether the source bus line adjacent to the G-pixel is R or B is alternated with respect to each horizontal line. That is, if a G-pixel in one horizontal line is sandwiched between an R-line and a G-line, a G-pixel in an adjacent horizontal line is sandwiched between a G-line and a B-line.

Structurally, a pixel electrode and a source bus line overlap at a certain position, with an insulating film in between. Therefore, there is a source-drain parasitic capacitance. Suppose that a capacitance between a pixel electrode and a source bus line that drives the pixel (in this case, a capacitance with a G-line) is Csd1, and a capacitance between a pixel electrode and a source bus line that does not drive the pixel (in this case, a capacitance with an R-line or a B-line) is Csd2. The potential of the G-pixel is attracted through these capacitances when the potentials of the source bus lines fluctuate. The G-pixel sandwiched between an R-line and a G-line is attracted to the R-line and the G-line, and the G-pixel sandwiched between a G-line and a B-line is attracted to the G-line and the B-line. The attraction by the G-line is the same in both cases. On the other hand, the attraction by the R-line and the attraction by the B-line are not always equal. Therefore, the voltage applied to the liquid crystal of the G-pixel is different with respect to each horizontal line. As a result, stripes (horizontal stripes) are formed by horizontal lines when an intermediate gradation is displayed by the G-pixel. This phenomenon occurs not only with respect to a green pixel G, but also with respect to a red pixel R and a blue pixel B.

For example, horizontal stripes appear saliently when R displays white, G displays an intermediate color, and B displays black.

SUMMARY OF THE INVENTION

An object of the present invention is to provide a display device that can reduce the parasitic capacitance between a pixel electrode and a source bus line.

Another object of the present invention is to provide a display device that can reduce the difference in the amount of attracted pixel potential with respect to each horizontal line, and thereby attain even display.

To attain the foregoing objects, a display device of the present invention includes: a gate bus line; a source bus line; a pixel electrode, which is provided within a region surrounded by the gate bus line and the source bus line, for receiving a data signal from the source bus line; and a shield electrode, which is provided so as not to touch the source bus line and the pixel electrode, for reducing a capacitance between the source bus line and the pixel electrode.

According to this arrangement, the shield electrode for reducing the capacitance between the source bus line and the pixel electrode is provided so as not to touch the source bus line and the pixel electrode. That is, the shield electrode has a function of shutting off an electric field between the source bus line and the pixel electrode. It is therefore possible to reduce the capacitance between the source bus line and the pixel electrode. As a result, there is an effect of reducing vertical crosstalk and flicker.

In addition to the foregoing arrangement, the display device of the present invention is such that the pixel electrode faces one side of the source bus line, and the shield electrode faces the other side of the source bus line.

According to this arrangement, the pixel electrode faces one side of the source bus line, and the shield electrode faces the other side of the source bus line. Therefore, the shield electrode can be manufactured by simply modifying the patterns of the gate bus line formed in an existing manufacturing process. As a result, in addition to the effect of the foregoing arrangement, there is an effect that it is possible to simplify the steps, and thereby reduce the increase of the manufacturing cost.

In addition to the foregoing arrangement, the display device of the present invention is such that the shield electrode and the gate bus line are provided in the same layer.

According to this arrangement, the shield electrode and the gate bus line are provided in the same layer. Therefore, the shield electrode can be manufactured by simply modifying the patterns of the gate bus line formed in an existing manufacturing process. As a result, in addition to the effect of the foregoing arrangement, there is an effect that it is possible to simplify the steps, and thereby reduce the increase of the manufacturing cost.

In addition to the foregoing arrangement, the display device of the present invention is such that the shield electrode is made of semiconductor.

According to this arrangement, the shield electrode is made of semiconductor. Therefore, the shield electrode can be manufactured by simply modifying the patterns of necessary semiconductor formed in an existing manufacturing process. As a result, in addition to the effect of the foregoing arrangement, there is an effect that it is possible to simplify the steps, and thereby reduce the increase of the manufacturing cost.

In addition to the foregoing arrangement, the display device of the present invention is such that the shield electrode and the source bus line are provided in the same layer.

According to this arrangement, the shield electrode and the source bus line are provided in the same layer. Therefore, the shield electrode can be manufactured by simply modifying the patterns of the source bus line formed in an existing manufacturing process. As a result, in addition to the effect of the foregoing arrangement, there is an effect that it is possible to simplify the steps, and thereby reduce the increase of the manufacturing cost.

In addition to the foregoing arrangement, the display device of the present invention is such that the shield electrode is provided between the source bus line and the pixel electrode.

According to this arrangement, the shield electrode is provided between the source bus line and the pixel electrode. Therefore, the shield electrode has a greater effect of shutting off an electric field generated between the source bus line and the pixel electrode. As a result, there is an effect that it is possible to reduce the capacitance between the source bus line and the pixel electrode more saliently.

In addition to the foregoing arrangement, the display device of the present invention is such that the source bus line faces one side of the pixel electrode, and the shield electrode faces the other side of the pixel electrode.

According to this arrangement, the source bus line faces one side of the pixel electrode, and the shield electrode faces the other side of the pixel electrode. Therefore, it is not necessary to provide a shield electrode to the other side of the pixel electrode. As a result, there is an effect that it is possible to increase design freedom concerning the other side of the pixel electrode.

In addition to the foregoing arrangement, the display device of the present invention is such that an entire surface of the shield electrode is surrounded by an insulating material.

According to this arrangement, an entire surface of the shield electrode is surrounded by an insulating material. This means that, among the layered structures constituting the display panel, the shield electrode is like a floating island isolated from surrounding conductive materials (the source bus line, the gate bus line, the auxiliary capacitance line, the pixel electrode, and the like). For example, the shield electrode may be connected to the ground. Therefore, it is possible to reduce the intensity of the electric field generated between the shield electrode and the source bus line. As a result, in addition to the effect of the foregoing arrangement, there is an effect that it is possible to reduce the burden on the source driver that drives the source bus line, and thereby reduce the increase of power consumption.

Moreover, since the shield electrode is not connected to another line, there is a greater degree of freedom in determining the positional relationship between the shield electrode and another line. Therefore, in addition to the effect of the foregoing arrangement, there is an effect that it is possible to increase the design freedom.

In addition to the foregoing arrangement, the display device of the present invention is such that the shield electrode is connected to a line other than the source bus line.

According to this arrangement, the shield electrode is connected to a line other than the source bus line. As a result, it is likely that the potential of the shield electrode is different from the potential of the source bus line. For example, the shield electrode is at least at certain time or always connected to another line whose potential is different from the potential of the source bus line. The another line may have a constant potential during a period in which the potential of the source bus line is constant, or may have a potential that changes at the timing when the potential of the source bus line changes. The another line may always keep a constant potential. Therefore, it is possible to strengthen the electric field between the shield electrode and the source bus line more certainly than in the case in which the shield electrode is provided like a floating island. As a result, there is an effect that it is possible to reduce the capacitance between the source bus line and the pixel electrode more saliently.

In addition to the foregoing arrangement, the display device of the present invention is such that the shield electrode is connected to the gate bus line.

According to this arrangement, the shield electrode is connected to the gate bus line. Therefore, it is possible to strengthen the electric field between the shield electrode and the source bus line more certainly than in the case in which the shield electrode is provided like a floating island. As a result, in addition to the effect of the foregoing arrangement, there is an effect that it is possible to reduce the capacitance between the source bus line and the pixel electrode more saliently.

In addition to the foregoing arrangement, the display device of the present invention further includes an auxiliary capacitance line, which is connected to the shield electrode.

According to this arrangement, the auxiliary capacitance line is connected to the shield electrode. Therefore, it is possible to strengthen the electric field between the shield electrode and the source bus line more certainly than in the case in which the shield electrode is provided like a floating island. As a result, in addition to the effect of the foregoing arrangement, there is an effect that it is possible to reduce the capacitance between the source bus line and the pixel electrode more saliently.

To attain the foregoing objects, a display device of the present invention includes: a plurality of source bus lines each of which has a continuous S-bend shape and is provided with concave regions; an insulating film covering the plurality of source bus lines; a plurality of pixel electrodes each of which is provided in a concave region at least partially; and a shield electrode, which is provided so as not to touch a source bus line that does not apply a data signal to one of the plurality of pixel electrodes and so as not to touch said one of the plurality of pixel electrodes, for reducing a capacitance between the source bus line and the pixel electrode.

According to this arrangement, the shield electrode for reducing the capacitance between the source bus line and the pixel electrode is provided so as not to touch a source bus line that does not apply a data signal to one of the plurality of pixel electrodes and so as not to touch said one of the plurality of pixel electrodes. That is, the shield electrode has a function of shielding off the electric field between the source bus line and the pixel electrode. Therefore, it is possible to make the difference, with respect to each horizontal line, in the amount of pixel potential attracted by the source bus line smaller. As a result, there is an effect that it is possible to prevent the difference, with respect to each horizontal line, in the amount of pixel potential attracted by the source bus line from appearing as a difference in luminance (=horizontal stripes) with respect to each horizontal line, and thereby attain even display.

In addition to the foregoing arrangement, the display device of the present invention is such that the pixel electrode faces one side of the source bus line, and the shield electrode faces the other side of the source bus line.

According to this arrangement, the pixel electrode faces one side of the source bus line, and the shield electrode faces the other side of the source bus line. Therefore, the shield electrode can be manufactured by simply modifying the patterns of the gate bus line formed in an existing manufacturing process. As a result, in addition to the effect of the foregoing arrangement, there is an effect that it is possible to simplify the steps, and thereby reduce the increase of the manufacturing cost.

In addition to the foregoing arrangement, the display device of the present invention is such that the shield electrode and the gate bus line are provided in the same layer.

According to this arrangement, the shield electrode and the gate bus line are provided in the same layer. Therefore, the shield electrode can be manufactured by simply modifying the patterns of the gate bus line formed in an existing manufacturing process. As a result, in addition to the effect of the foregoing arrangement, there is an effect that it is possible to simplify the steps, and thereby reduce the increase of the manufacturing cost.

In addition to the foregoing arrangement, the display device of the present invention is such that the shield electrode is made of semiconductor.

According to this arrangement, the shield electrode is made of semiconductor. Therefore, the shield electrode can be manufactured by simply modifying the patterns of necessary semiconductor formed in an existing manufacturing process. As a result, in addition to the effect of the foregoing arrangement, there is an effect that it is possible to simplify the steps, and thereby reduce the increase of the manufacturing cost.

In addition to the foregoing arrangement, the display device of the present invention is such that the shield electrode and the source bus line are provided in the same layer.

According to this arrangement, the shield electrode and the source bus line are provided in the same layer. Therefore, the shield electrode can be manufactured by simply modifying the patterns of the source bus line formed in an existing manufacturing process. As a result, in addition to the effect of the foregoing arrangement, there is an effect that it is possible to simplify the steps, and thereby reduce the increase of the manufacturing cost.

In addition to the foregoing arrangement, the display device of the present invention is such that the shield electrode is provided between the source bus line and the pixel electrode.

According to this arrangement, the shield electrode is provided between the source bus line and the pixel electrode. Therefore, the shield electrode has a greater effect of shutting off an electric field generated between the source bus line and the pixel electrode. As a result, there is an effect that it is possible to reduce the capacitance between the source bus line and the pixel electrode more saliently.

In addition to the foregoing arrangement, the display device of the present invention is such that the source bus line faces one side of the pixel electrode, and the shield electrode faces the other side of the pixel electrode.

According to this arrangement, the source bus line faces one side of the pixel electrode, and the shield electrode faces the other side of the pixel electrode. Therefore, it is not necessary to provide a shield electrode to the other side of the pixel electrode. As a result, there is an effect that it is possible to increase design freedom concerning the other side of the pixel electrode.

In addition to the foregoing arrangement, the display device of the present invention is such that an entire surface of the shield electrode is surrounded by an insulating material.

According to this arrangement, an entire surface of the shield electrode is surrounded by an insulating material. This means that, among the layered structures constituting the display panel, the shield electrode is like a floating island isolated from surrounding conductive materials (the source bus line, the gate bus line, the auxiliary capacitance line, the pixel electrode, and the like). For example, the shield electrode may be connected to the ground. Therefore, it is possible to reduce the intensity of the electric field generated between the shield electrode and the source bus line. As a result, in addition to the effect of the foregoing arrangement, there is an effect that it is possible to reduce the burden on the source driver that drives the source bus line, and thereby reduce the increase of power consumption.

Moreover, since the shield electrode is not connected to another line, there is a greater degree of freedom in determining the positional relationship between the shield electrode and another line. Therefore, in addition to the effect of the foregoing arrangement, there is an effect that it is possible to increase the design freedom.

In addition to the foregoing arrangement, the display device of the present invention is such that the shield electrode is connected to a line other than the source bus line.

According to this arrangement, the shield electrode is connected to a line other than the source bus line. As a result, it is likely that the potential of the shield electrode is different from the potential of the source bus line. For example, the shield electrode is at least at certain time or always connected to another line whose potential is different from the potential of the source bus line. The another line may have a constant potential during a period in which the potential of the source bus line is constant, or may have a potential that changes at the timing when the potential of the source bus line changes. The another line may always keep a constant potential. Therefore, it is possible to strengthen the electric field between the shield electrode and the source bus line more certainly than in the case in which the shield electrode is provided like a floating island. As a result, there is an effect that it is possible to reduce the capacitance between the source bus line and the pixel electrode more saliently.

In addition to the foregoing arrangement, the display device of the present invention is such that the shield electrode is connected to the gate bus line.

According to this arrangement, the shield electrode is connected to the gate bus line. Therefore, it is possible to strengthen the electric field between the shield electrode and the source bus line more certainly than in the case in which the shield electrode is provided like a floating island. As a result, in addition to the effect of the foregoing arrangement, there is an effect that it is possible to reduce the capacitance between the source bus line and the pixel electrode more saliently.

In addition to the foregoing arrangement, the display device of the present invention further includes an auxiliary capacitance line, which is connected to the shield electrode.

According to this arrangement, the auxiliary capacitance line is connected to the shield electrode. Therefore, it is possible to strengthen the electric field between the shield electrode and the source bus line more certainly than in the case in which the shield electrode is provided like a floating island. As a result, in addition to the effect of the foregoing arrangement, there is an effect that it is possible to reduce the capacitance between the source bus line and the pixel electrode more saliently.

In addition to the foregoing arrangement, the display device of the present invention is such that the shield electrode and the source bus line are provided in the same layer; and an auxiliary capacitance line is provided below the shield electrode.

According to this arrangement, the shield electrode and the source bus line are provided in the same layer; and an auxiliary capacitance line is provided below the shield electrode. Therefore, since the auxiliary capacitance line also functions as a shield electrode, there is an effect that, in addition to the effect of the foregoing arrangement, it is possible to reduce the capacitance between the source bus line and the pixel electrode more effectively.

To solve the foregoing problems, a display device of the present invention includes: a plurality of source bus lines each of which has a continuous S-bend shape and is provided with concave regions; an insulating film covering the plurality of source bus lines; and a plurality of pixel electrodes each of which is provided in a concave region at least partially, Csd2 being smaller than Csd1, where Csd1 is a capacitance formed between one of the plurality of pixel electrodes and a first source bus line, which applies a data signal to said one of the plurality of pixel electrodes, and Csd2 is a capacitance formed between said one of the plurality of pixel electrodes and a second source bus line, which is a next source bus line from the first source bus line, provided to an opposite side of said one of the plurality of pixel electrodes from the first source bus line.

According to this arrangement, Csd2 is smaller than Csd1. If Csd2 is smaller than Csd1, it is possible to reduce the difference, with respect to each horizontal line, in the amount of pixel potential attracted by the source bus line, as compared to the case where Csd2 is equal to or larger than Csd1. As a result, there is an effect that it is possible to prevent the difference, with respect to each horizontal line, in the amount of pixel potential attracted by the source bus line from appearing as a difference in luminance (=horizontal stripes) with respect to each horizontal line, and thereby attain even display.

To solve the foregoing problems, a display device of the present invention includes: a plurality of source bus lines each of which has a continuous S-bend shape and is provided with concave regions; an insulating film covering the plurality of source bus lines; and a plurality of pixel electrodes each of which is provided in a concave region at least partially, a first source bus line applying a data signal to one of the plurality of pixel electrodes, and a second source bus line, which is a next source bus line from the first source bus line, provided on an opposite side of said one of the plurality of pixel electrodes from the first source bus line being such that, in a direction parallel to horizontal lines, length L2 of a portion of the second source bus line that overlaps said one of the plurality of pixel electrodes is shorter than (width of a source bus line—distance between two pixel electrodes)/2.

According to this arrangement, L2 is shorter than (width of a source bus line—distance between two pixel electrodes)/2. Therefore, it is possible to reduce the difference, with respect to each horizontal line, in the amount of pixel potential attracted by the source bus line. As a result, there is an effect that it is possible to prevent the difference, with respect to each horizontal line, in the amount of pixel potential attracted by the source bus line from appearing as a difference in luminance (=horizontal stripes) with respect to each horizontal line, and thereby attain even display.

In addition to the foregoing arrangement, the display device of the present invention is such that each of the plurality of source bus lines is used exclusively for pixels of one color.

According to this arrangement, each of the plurality of source bus lines is used exclusively for pixels of one color. This means that, for example, one source bus line is exclusively for R (red), B (blue), or G (green). Therefore, one source bus line that is for R is never used for G. As a result, in addition to the effect of the foregoing arrangement, there is an effect that it is possible to reduce the capacitance between the source bus line and the pixel electrode more effectively.

In addition to the foregoing arrangement, the display device of the present invention is such that each of the plurality of source bus lines supplies a data signal to a pixel electrode opposed to a convex region.

According to this arrangement, each of the plurality of source bus lines supplies a data signal to a pixel electrode opposed to a convex region. As a result, in addition to the effect of the foregoing arrangement, there is an effect that it is possible to reduce the capacitance between the source bus line and the pixel electrode more effectively.

For a fuller understanding of the nature and advantages of the invention, reference should be made to the ensuing detailed description taken in conjunction with the accompanying drawings.

DESCRIPTION OF THE EMBODIMENTS

[Embodiment 1]

Figure 1:
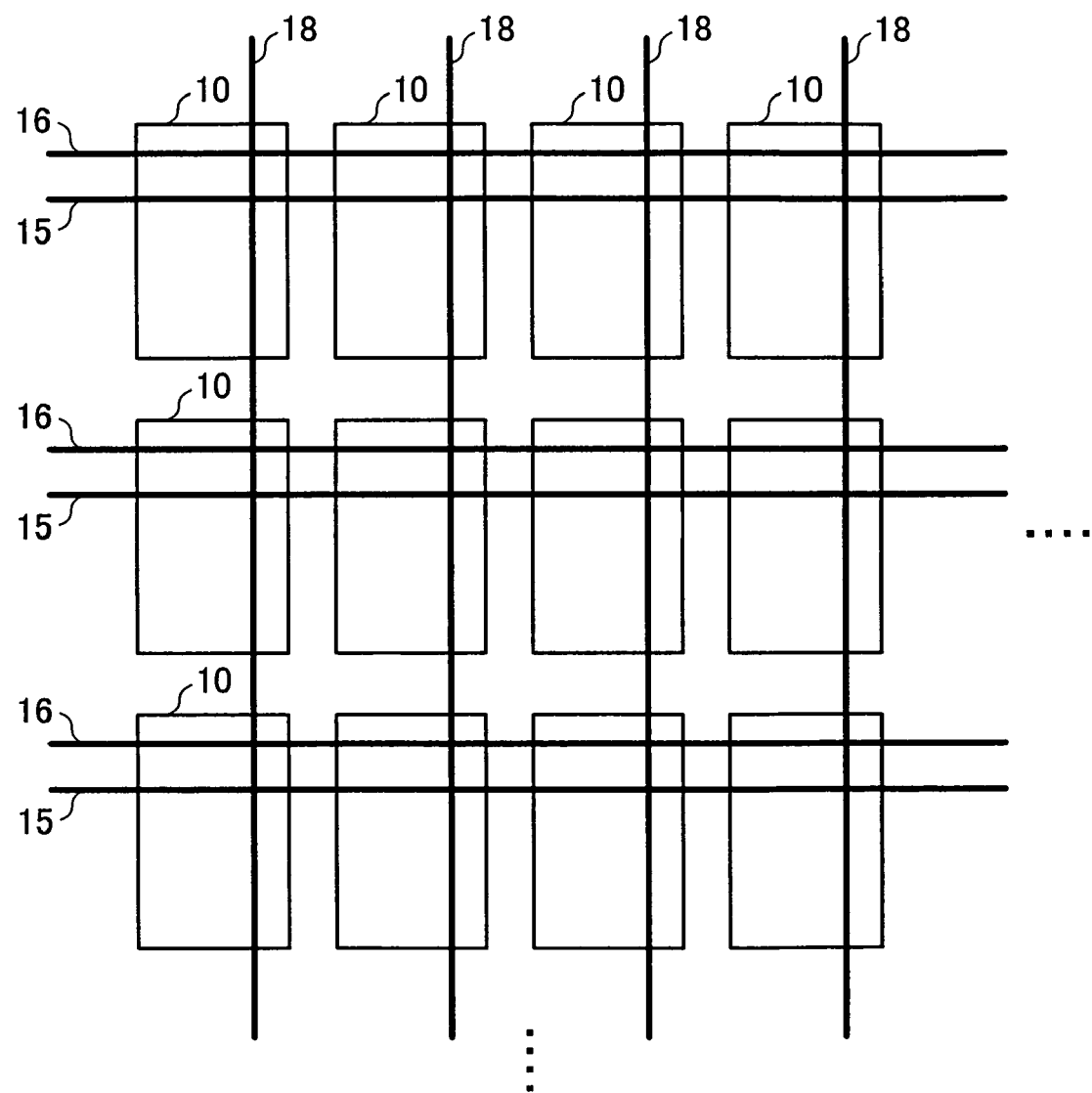
FIG. 1 is a plan view illustrating an arrangement example of a display panel of a liquid crystal display device in accordance with the present invention.
Figure 2:
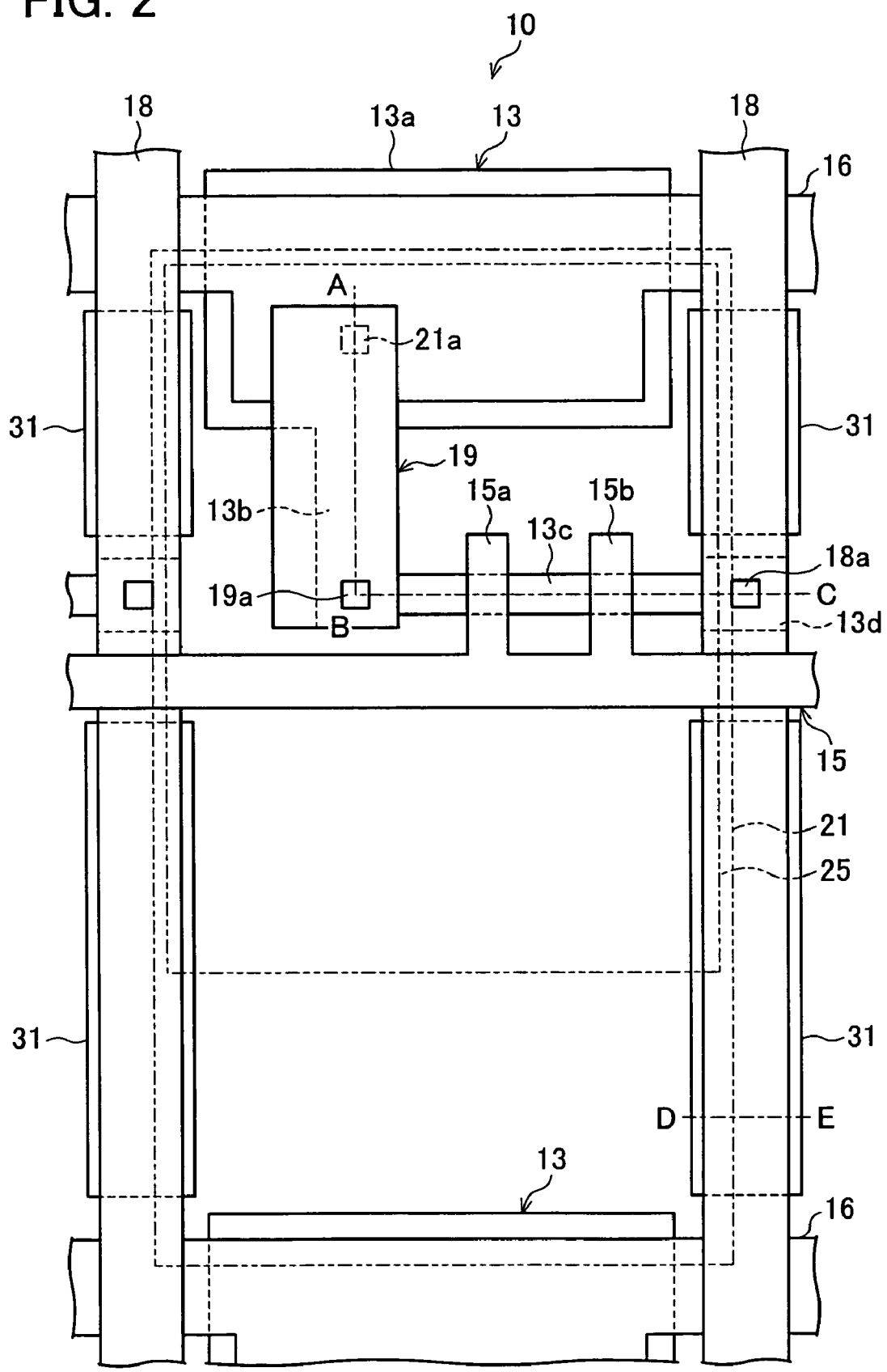
FIG. 2 is a plan view illustrating an arrangement example of the display panel of the liquid crystal display device in accordance with the present invention, where a shield electrode is made of the same material as a gate bus line, and is provided in a floating position.
Figure 3:
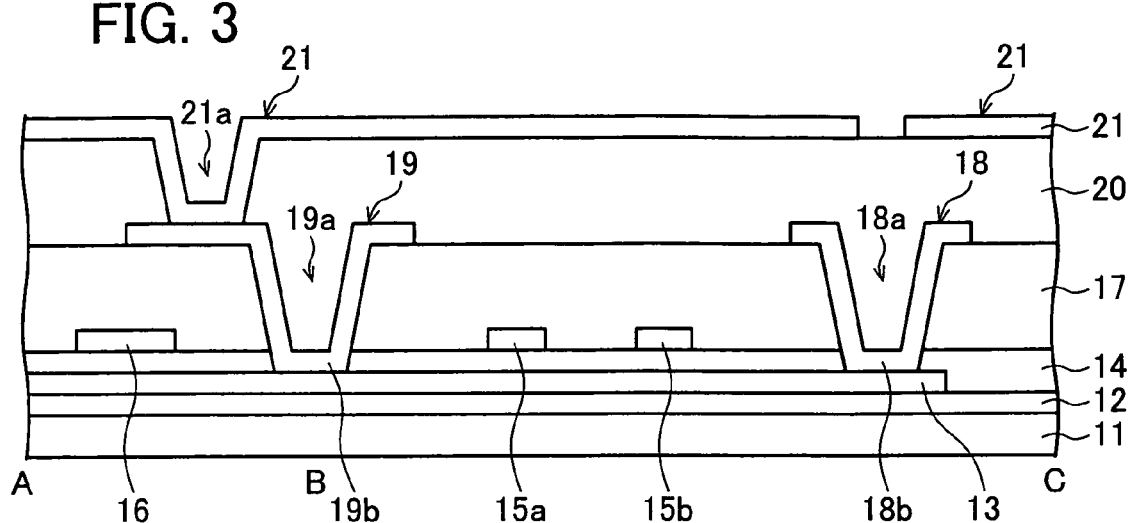
FIG. 3 is a cross-sectional view illustrating an arrangement example of the display panel of the liquid crystal display device in accordance with the present invention.

A liquid crystal display device of the present embodiment is an active matrix liquid crystal display device, whose display pixel section 10 is provided with a gate bus line 15, a source bus line 18, an auxiliary capacitance line 16, a pixel electrode 21, and an opposed electrode (not shown), as shown in FIGS. 1 to 3. The pixel electrode 21 is a region surrounded by the gate bus line and the source bus line, and the pixel electrode 21 receives a data signal from the source bus line. The opposed electrode is opposed to the pixel electrode. The source bus line 18 may be provided so as to overlap with the pixel electrode 21, with an insulating film in between. The reference numeral 25 indicates a reflection electrode.

Figure 4:
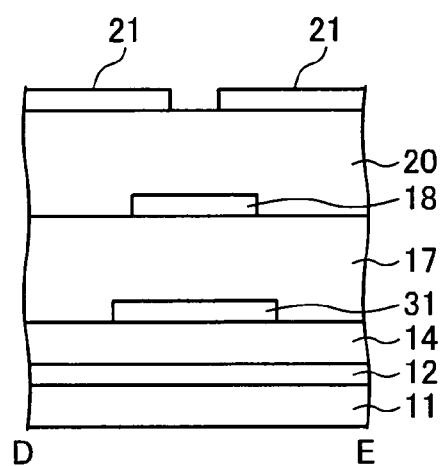
FIG. 4 is a cross-sectional view illustrating an arrangement example of the display panel of the liquid crystal display device in accordance with the present invention, where the shield electrode is made of the same material as the gate bus line.

The portions A through E in FIG. 2 respectively correspond to the portions A through E in FIGS. 3 and 4.

The reference numeral 16 indicates an auxiliary capacitance line.

The reference numeral 13 indicates an Si semiconductor layer including regions 13a, 13b, 13c, and 13d respectively overlapping with the auxiliary capacitance line 16, a drain electrode 19, gate electrodes 15a and 15b, and a source electrode of the source bus line 18.

The source bus line 18 is connected to the Si semiconductor layer 13 at a contact hole 18a.

The reference numeral 19 indicates the drain electrode, which is connected to the pixel electrode 21 and the region 13c through a contact hole 21a and a contact hole 19a, respectively.

In the present embodiment, a shield electrode 31 is provided in the vicinity of the pixel electrode 21 and the source bus line 18. The shield electrode 31 is formed so as to reduce a source-drain parasitic capacitance (Csd) between the pixel electrode 21 and the source bus line 18 (hereinafter simply referred to as "parasitic capacitance").

A shield electrode is a conductor in general having a function of shutting off an electric field generated between other electrodes. Therefore, the shield electrode includes not only an electrode connected to a line for supplying a potential (e.g. gate bus line), but also an electrode not connected to a line for supplying a potential (e.g. so-called floating state). The conductor in general includes not only a good conductor such as a metal film, but also a P-doped n+ semiconductor, for example.

As described above, the pixel electrode 21 is provided so as to overlap with the source bus line 18. Therefore, when a data signal is applied to the source bus line 18 in order to display an image, an electric field is generated between the pixel electrode 21 and the source bus line 18. The electric field forms a parasitic capacitance at a position where the pixel electrode 21 and the source bus line 18 overlap. As described above, the parasitic capacitance is undesirable, because it can cause vertical crosstalk and flicker. In the present embodiment, the shield electrode 31, which is made of insulator or semiconductor, is provided in such a position as to be detached (i.e. insulated) from the pixel electrode 21 and the source bus line 18. In this way, the shield electrode 31 carries out a function of shutting off the electric field, thereby reducing the parasitic capacitance.

In the vicinity of the source bus line 18, electric fields are generated not only in a region sandwiched between the pixel electrode 21 and the source bus line 18, but also in all directions, due to the signal applied to the source bus line 18. There is an electric field also in a direction opposite the pixel electrode 21, seen from the source bus line 18. Since the pixel electrode 21 is in the vicinity of the source bus line 18, this electric field is also applied to the pixel electrode 21. Therefore, by thus providing the shield electrode 31 at the position where the electric field is generated, the shield electrode 31 can shut off the electric field applied from the source bus line 18 to the pixel electrode 21 as described above. In other words, the shield electrode 31 can reduce the capacitance formed between the pixel electrode 21 and the source bus line 18. It is well-known that, in general, a capacitance is influenced by the properties of a space in which an electric field can exist between two conductors. In the present embodiment, this space is transformed into a space in which electric flux lines emitted from the source bus line do not enter into the pixel electrode 21 easily. This is nothing but a reduction of the capacitance.

In the present embodiment, as shown in FIG. 2, the shield electrode 31 is a flat rectangle extending along the longitudinal direction of the source bus line 18 (the direction orthogonal to horizontal lines).

In the present embodiment, as shown in FIG. 4, the shield electrode 31 is provided so as to face one side of the source bus line 18 (i.e. provided to the lower side of FIG. 4), while the pixel electrode 21 is provided so as to face the other side of the source bus line 18. Here, the shield electrode 31 is provided so as to sandwich an interlayer insulating film 17, which is an insulating layer provided below the source bus line 18.

As shown in FIGS. 3 and 4, the source bus line 18 is provided so as to overlap with two pixel electrodes 21. Here, the center of the shield electrode 31 in the longitudinal direction (the direction orthogonal to horizontal lines) corresponds to the center of the source bus line 18 in the longitudinal direction. In other words, the shield electrode 31 is symmetrical with respect to a plane (not shown; plane S) that passes through the center of the source bus line 18 and that is orthogonal to horizontal lines. As a result, in the present embodiment, the parasitic capacitances between the source bus line 18 and both the pixel electrodes 21 are reduced equally.

In the present embodiment, the shield electrode 31 and the gate bus line 15 are provided in the same layer. Moreover, in the present embodiment, the shield electrode 31 and the gate bus line 15 are made of the same material. Therefore, it is not necessary to use different materials. Accordingly, it is possible to cut down the increase of the manufacturing cost caused by providing the shield electrode 31.

In the present embodiment, the shield electrode 31 is provided in a floating position. The floating position is such a position that the shield electrode 31 is completely insulated from any member supplied with any electric signal (potential). In other words, the floating position is such a position that the entire surface of the shield electrode 31 is surrounded by an insulator. With this structure, the shield electrode 31 is like a floating island on an insulator. The shield electrode 31 may be connected to the ground.

A capacitance (hereinafter "shield capacitance") is formed also between the shield electrode 31 and the source bus line 18. For a source driver (not shown), this capacitance is also a load. However, if the shield electrode 31 is provided in the floating position, it is possible to prevent this capacitance from increasing. Accordingly, it is possible to reduce power consumption.

Moreover, if the shield electrode 31 is provided in the floating position, it is not necessary to worry about how to connect the shield electrode 31 to other lines. Accordingly, design freedom can be increased.

The following describes a method for manufacturing a liquid crystal display device. Before discussing a manufacturing procedure for the present embodiment, the following describes a manufacturing procedure for a commonly adopted structure.

Figure 38:
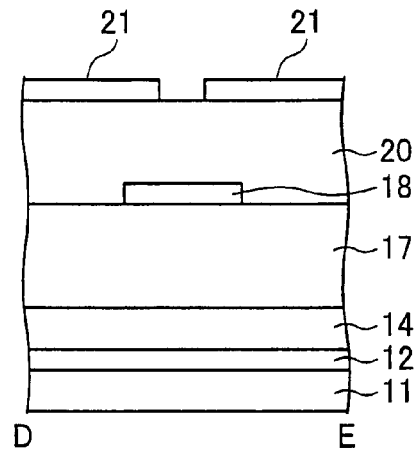
FIG. 38 is a cross-sectional view illustrating an arrangement example of a display panel of a conventional liquid crystal display device.
Figure 39:
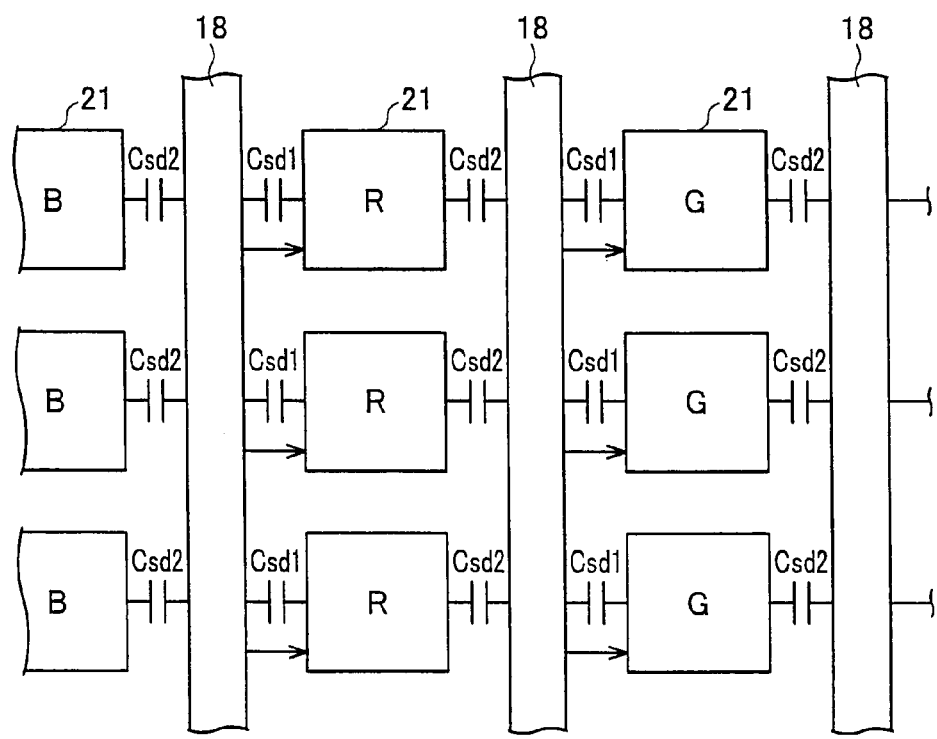
FIG. 39 is a schematic diagram illustrating how source-drain parasitic capacitances are formed.
Figure 40:
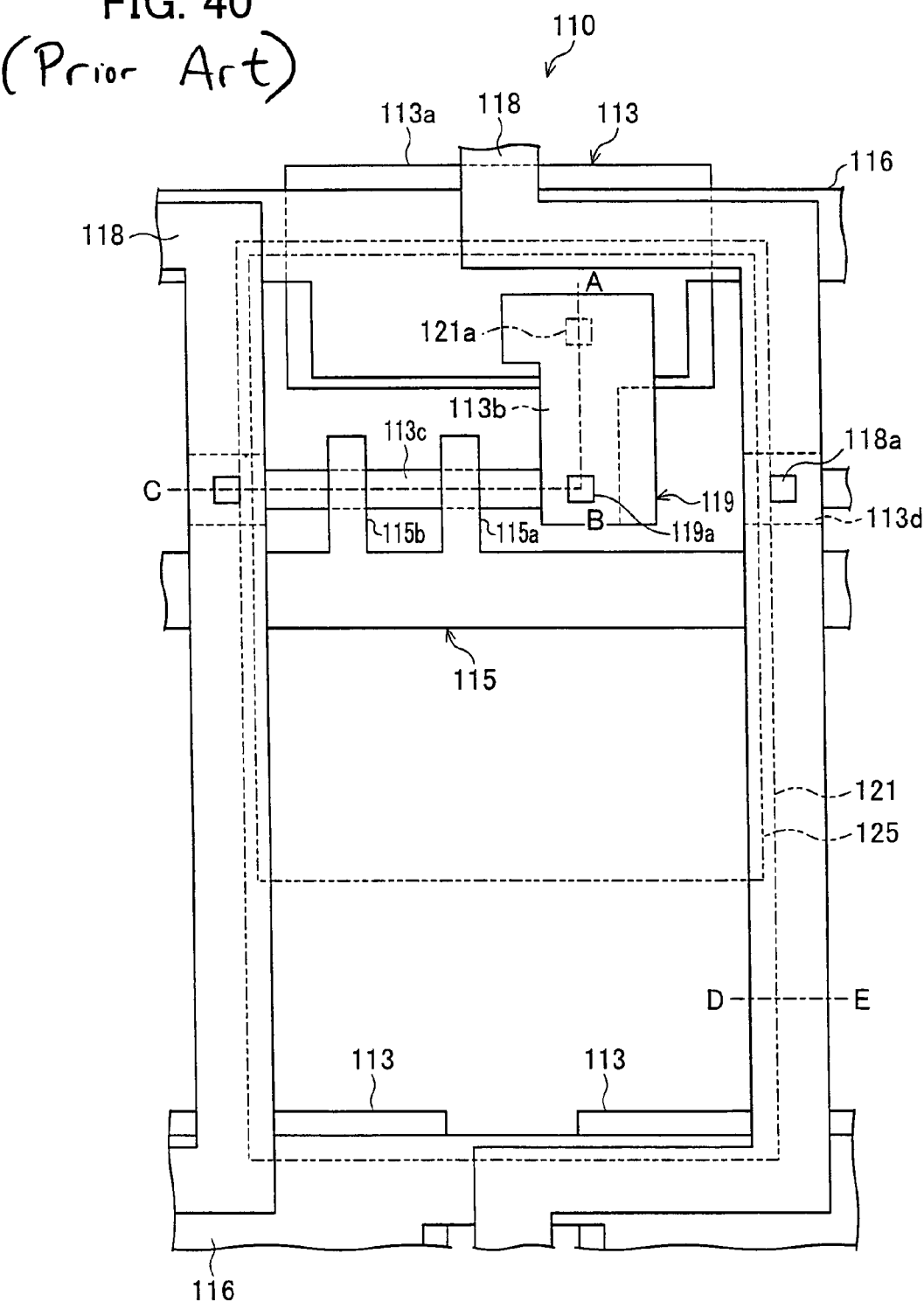
FIG. 40 is a plan view illustrating an arrangement example of a display panel of a conventional liquid crystal display device.

First, as shown in FIGS. 3 and 38, a base coat 12 is deposited by plasma CVD onto a glass substrate (insulating substrate) 11. The base coat 12 is made of $SiO_2$, and the thickness of the base coat 12 is 100 nm.

Next, onto the base coat 12, an Si semiconductor layer 13 (e.g. a silicon layer) is deposited by plasma CVD. The thickness of the Si semiconductor layer 13 is 50 nm. The Si semiconductor layer 13 is recrystallized by laser annealing (heat processing). Then, the Si semiconductor layer 13 is patterned into a predetermined flat shape.

Onto the Si semiconductor layer 13, a gate insulating film 14 is deposited by plasma CVD. The gate insulating film 14 is made of $SiO_2$, and the thickness of the gate insulating film 14 is 100 nm.

On the gate insulating film 14, conductive materials GE, which include a tantalum nitride film (thickness: 50 nm) and a tungsten film (thickness: 370 nm), are sequentially deposited by sputtering. Then, the conductive materials GE are patterned into predetermined patterns, so as to form an auxiliary capacitance line 16 and a gate bus line 15 (including gate electrodes 15a and 15b). The conductive materials GE may include an element selected from Ta, W, Ti, Mo, Al, and Cu, an alloy material consisting mainly of these elements, or a compound material.

Into the Si semiconductor layer 13, P (phosphorus) is doped from above the gate electrodes 15a and 15b through the gate insulating film 14, so as to turn the Si semiconductor layer 13 into an n− region or an n+ region (a source region and a gate region of a transistor). In this way, a transistor is formed. This is a procedure for forming an N-channel. In order to form a P-channel, B (boron) is doped into the Si semiconductor layer 13.

Further, the impurity element added to the Si semiconductor layer 13 is activated by heat processing.

Further, as an insulating film, an interlayer insulating film 17, which includes a silicon nitride film and a silicon oxide film, is formed (thickness: 950 nm) by CVD.

Then, contact hole sections 18a and 19a are formed through the gate insulating film 14 and the interlayer insulating film 17, respectively. The contact hole sections 18a and 19a reach the drain region and the source region of the transistor section.

After that, conductive materials SE (here, the conductive materials SE and the source bus line are the same material), which include Ti (thickness: 100 nm), Al (thickness: 500 nm), and Ti (thickness: 100 nm), are sequentially deposited by spattering. The conductive materials SE are patterned into predetermined shapes, so as to form the source bus line 18 and the drain electrode 19.

The Si semiconductor layer 13 is hydrogenated by heat processing the foregoing laminate structure. This hydrogenation step is a step of terminating dangling bond of the Si semiconductor layer 13 by using hydrogen contained in the interlayer insulating film 17, which includes the silicon nitride film and the like.

Further, a resin layer 20, which is made of organic insulating material, is formed on the interlayer insulating film 17, the source bus line 18, and the drain electrode 19. The thickness of the resin layer 20 is 1.6 μm.

Further, a contact hole 21a, which reaches the drain electrode 19, is formed. Then, ITO (indium tin oxide) is deposited (thickness: 100 nm) by spattering, and shaped into predetermined shapes, so as to form a plurality of pixel electrodes 21 arranged in matrix.

After that, an alignment film (not shown) is printed onto the pixel electrodes 21 and the resin layer 20 and rubbing is performed in a predetermined direction. As a result, an active matrix substrate of the present embodiment is completed.

On the alignment-film side of the active matrix substrate, spherical spacers (not shown) are diffused, or a resin insulating film is formed in a column-like shape. Then, an opposed substrate (not shown) is evenly bonded with the active matrix substrate at a predetermined interval. Between the active matrix substrate and the opposed substrate, a liquid crystal layer is sandwiched. On the opposed substrate, an opposed electrode (transparent electrode; not shown) is provided. After an alignment film is printed on the opposed electrode, rubbing is performed in the foregoing manner. In this way, an active matrix liquid crystal display device (display device using an active matrix substrate) is completed.

The following describes a manufacturing method of the present embodiment. Those parts identical to the foregoing commonly adopted procedure are omitted.

As shown in FIGS. 3 and 4, the gate insulating film 14 is provided, and, onto the gate insulating film 14, the conductive materials GE are sequentially deposited by spattering. Then, the conductive materials GE, the auxiliary capacitance line 16, and the gate bus line 15 (including the gate electrodes 15a and 15b) are patterned into a predetermined shape, so as to form the shield electrode 31.

Thus, by simply changing the patterned shape of the gate bus line 15, the shield electrode 31 can be formed by the existing manufacturing process. Therefore, even though the shield electrode 31 is provided as a new member, it is possible to cut down the increase of the manufacturing cost.

The present invention is also applicable to a top gate structure and to an inversely staggered structure.

Although the example described above is an example of a stripe arrangement, the present invention is also applicable to a delta arrangement.

Figure 5:
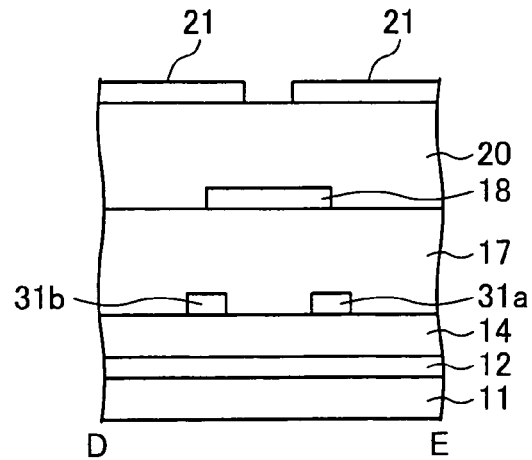
FIG. 5 is a cross-sectional view illustrating an arrangement example of the display panel of the liquid crystal display device in accordance with the present invention, where the shield electrode is made of the same material as the gate bus line.

As shown in FIG. 5, shield electrodes 31a and 31b may be provided. The shield electrodes 31a and 31b are edge portions of the shield electrode 31 of FIG. 4 that remain after the portion including the center of the shield electrode 31 in the longitudinal direction is removed. Like the shield electrode 31 of FIG. 4, the shield electrodes 31a and 31b are symmetrical with respect to the plane S.

This arrangement can reduce the area where the shield electrodes and the source bus line 18 overlap. Accordingly, it is possible to reduce the shield capacitance.

Figure 6:
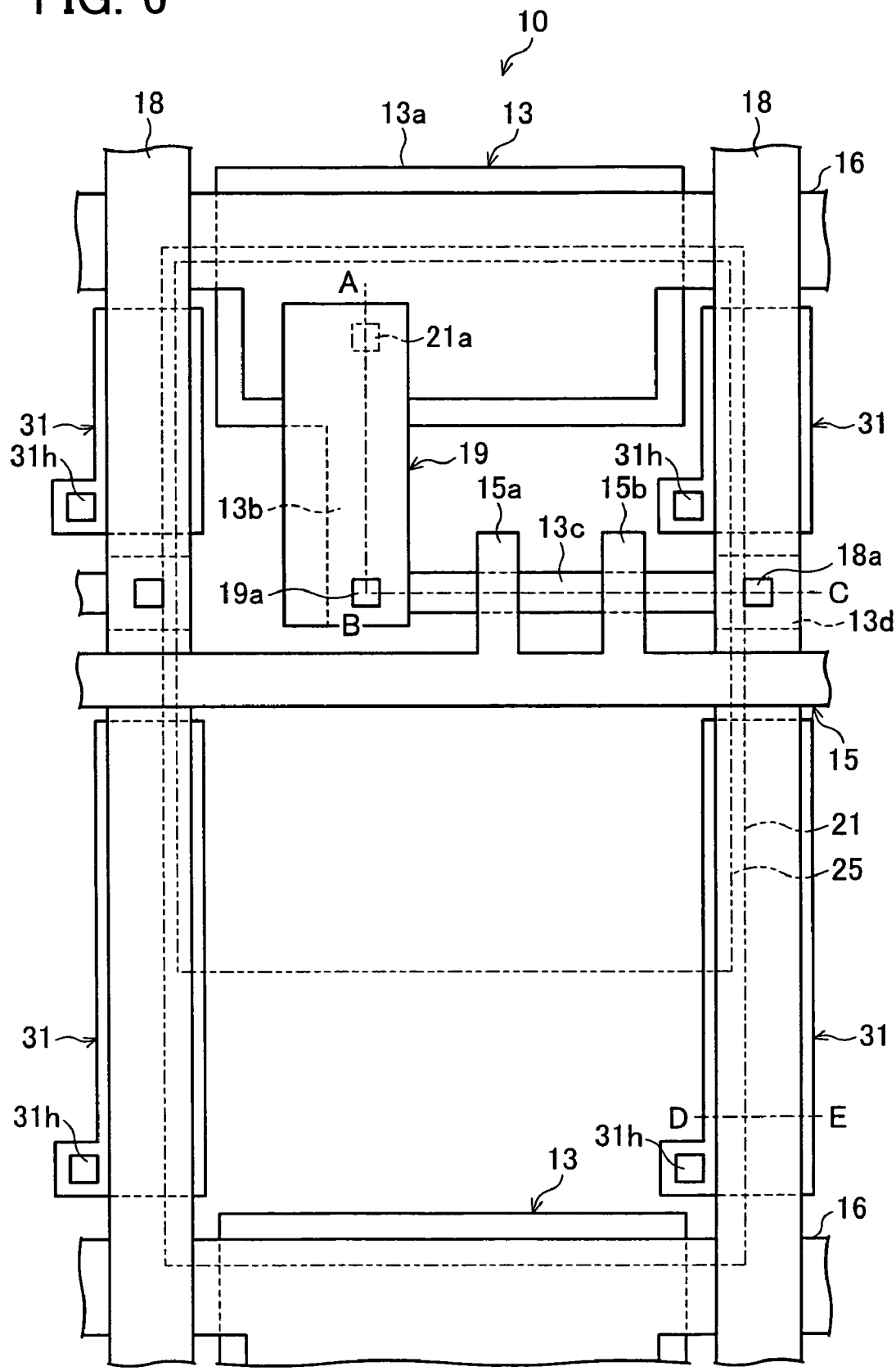
FIG. 6 is a plan view illustrating an arrangement example of the display panel of the liquid crystal display device in accordance with the present invention, wherein the shield electrode is made of the same material as the gate bus line, and is connected to an arbitrary electrode other than the source bus line.

As another example, instead of being provided in a floating position, the shield electrode 31 may be connected to an arbitrary line (including an electrode) other than the source bus line 18, as shown in FIG. 6. The shield electrode 31 may be connected to the line through a contact hole 31h. The contact hole 31h can be formed by forming, on the surface where the shield electrode 31 is to be formed, a hole that reaches the line, and appropriately changing the patterning for forming the shield electrode.

With this arrangement, it is likely that the potential of the shield electrode 31 is different from the potential of the source bus line 18. Therefore, it is possible to strengthen the electric field between the shield electrode 31 and the source bus line 18 more certainly than in the case in which the shield electrode is provided like a floating island. As a result, it is possible to reduce the capacitance between the source bus line 18 and the pixel electrode 21 more saliently.

For example, the shield electrode 31 is at least at certain time or always connected to another line whose potential is different from the potential of the source bus line. The another line may have a constant potential during a period in which the potential of the source bus line is constant, or may have a potential that changes at the timing when the potential of the source bus line changes. The another line may always keep a constant potential.

Figure 7:
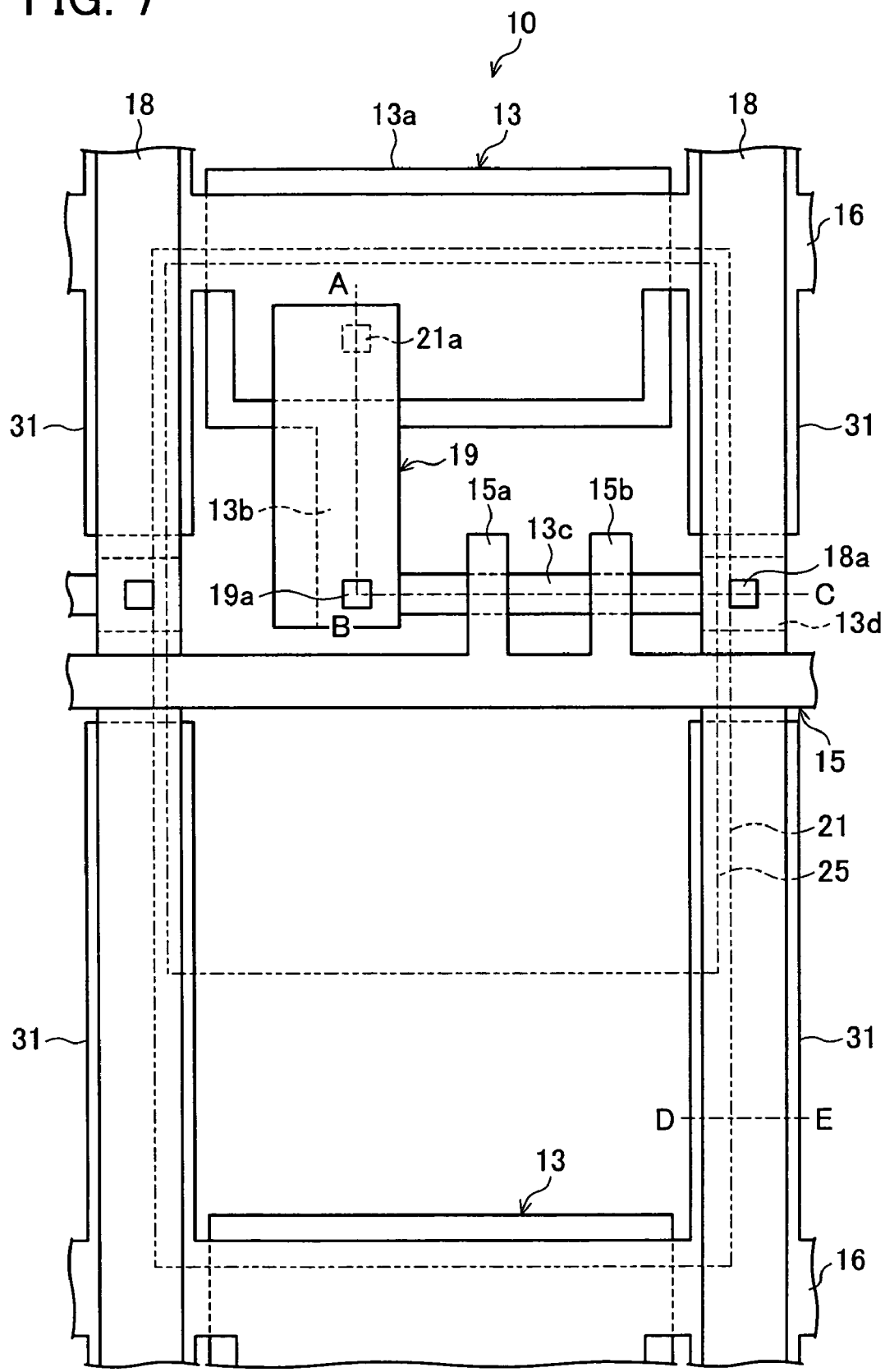
FIG. 7 is a plan view illustrating an arrangement example of the display panel of the liquid crystal display device in accordance with the present invention, wherein the shield electrode is made of the same material as the gate bus line, and is connected to an auxiliary capacitance line.

As shown in FIG. 7, the shield electrode 31 may be connected to the auxiliary capacitance line 16, which is an arbitrary line other than the source bus line 18.

[Embodiment 2]

Figure 8:
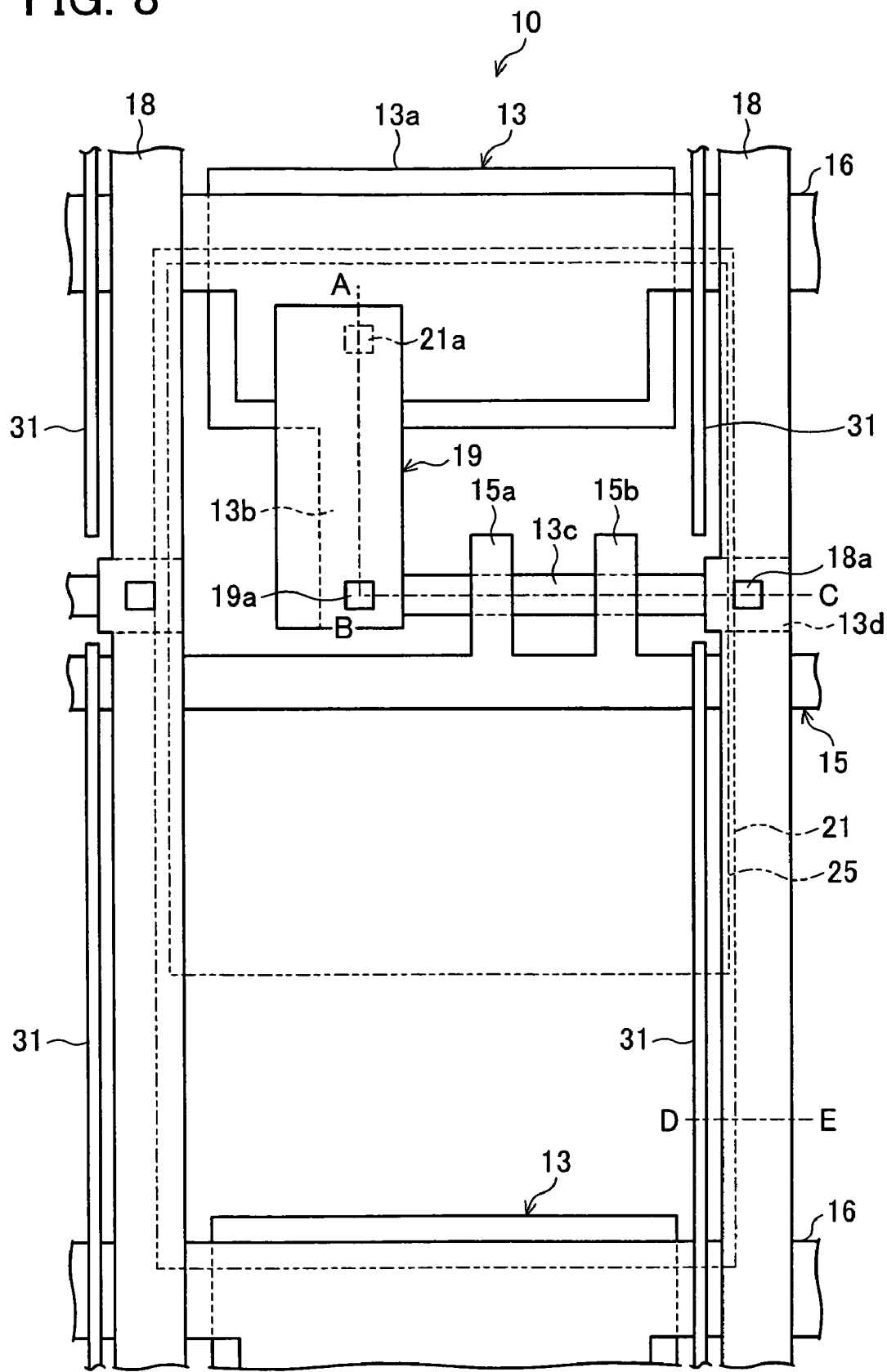
FIG. 8 is a plan view illustrating an arrangement example of the display panel of the liquid crystal display device in accordance with the present invention, wherein the shield electrode is made of the same material as the source bus line, and is provided in a floating position.
Figure 9:
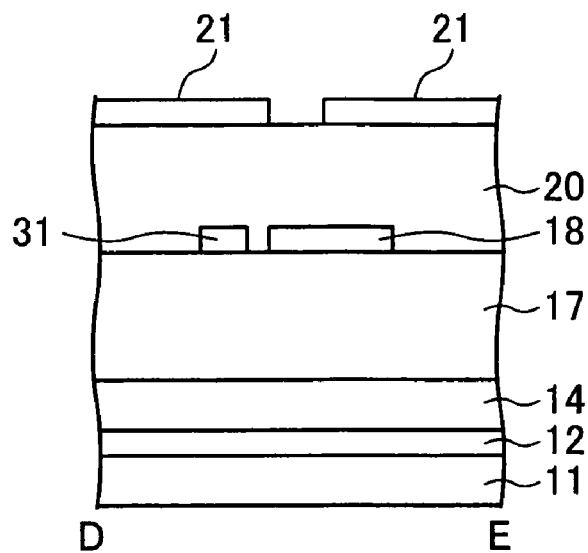
FIG. 9 is a cross-sectional view illustrating an arrangement example of the display panel of the liquid crystal display device in accordance with the present invention, wherein the shield electrode is made of the same material as the source bus line.

In the present embodiment, as shown in FIGS. 8 and 9, the center of the source bus line 18 in the longitudinal direction (the direction orthogonal to horizontal lines) does not correspond to the center (center G) of the distance between the two pixel electrodes 21 that are on the same horizontal line and are closest to the source bus line 18. The area of overlap between the source bus line 18 and one of the two pixel electrodes 21 is different from the area of overlap between the source bus line 18 and the other of the two pixel electrodes 21. Specifically, the area of overlap between the source bus line 18 and the pixel electrode 21 on the left is smaller than the area of overlap between the source bus line 18 and the pixel electrode 21 on the right (see FIG. 9). The area of overlap between the source bus line 18 and the pixel electrode 21 on the left (see FIG. 9) may be zero.

The shield electrode 31 and the source bus line 18 are provided in the same layer. The shield electrode 31 is provided along the longitudinal direction of the source bus line 18, in the vicinity of the pixel electrode farther from the source bus line 18 (the pixel electrode 21 on the left in FIG. 9). More specifically, the shield electrode 31 is provided directly below the pixel electrode 21, with the resin layer 20 in between.

In the present embodiment, the shield electrode 31 and the source bus line 18 are made of the same material. Therefore, it is not necessary to use different materials. Accordingly, it is possible to cut down the increase of the manufacturing cost caused by providing the shield electrode 31.

As described above, in the present embodiment, the shield electrode 31 and the gate bus line 18 are provided in the same layer. As a result, by simply changing the patterned shape of the gate bus line 18, the shield electrode 31 can be formed by the existing manufacturing process. Therefore, even though the shield electrode 31 is provided as a new member, it is possible to cut down the increase of the manufacturing cost.

In the present embodiment, the shield electrode 31 is provided in the floating position. As a result, it is possible to cut down the increase of the shield capacitance, and thereby cut off the increase of the power consumption. Moreover, it is possible to increase design freedom.

The rest of the manufacturing process is omitted, because it is the same as the manufacturing process described with reference to FIGS. 2 to 4.

Figure 10:
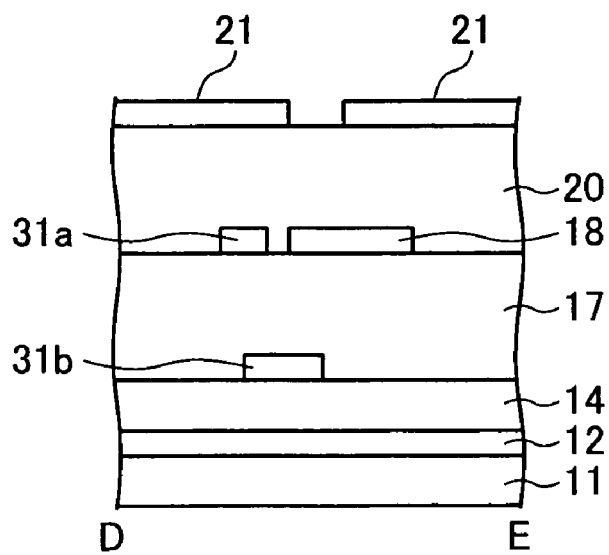
FIG. 10 is a cross-sectional view illustrating an arrangement example of the display panel of the liquid crystal display device in accordance with the present invention, where one shield electrode is made of the same material as the source bus line, and the other shield electrode is made of the same material as the gate bus line.

As shown in FIG. 10, the shield electrode may be the shield electrode 31a provided in the same layer as the source bus line 18 like the shield electrode 31 of FIG. 9 and the shield electrode 31b provided in the same layer as the gate bus line 15.

In the example of FIG. 10, the center of the shield electrode 31b in the longitudinal direction (the direction orthogonal to horizontal lines) does not correspond to the center G, and the area of overlap between the shield electrode 31b and one of the two pixel electrodes 21 is different from the area of overlap between the shield electrode 31b and the other of the two pixel electrodes 21. Specifically, the area of overlap between the shield electrode 31b and the pixel electrode 21 on the left is larger than the area of overlap between the shield electrode 31b and the pixel electrode 21 on the right (see FIG. 10). This relationship between the areas of overlap is directly opposite in the case in which the source bus line 18 overlaps the pixel electrodes 21. The area of overlap between the shield electrode 31b and the pixel electrode 21 on the right (see FIG. 10) may be zero.

As a result, the shield electrode 31b reduces, to a greater degree, the parasitic capacitance between the source bus line 18 and the pixel electrode 21 that has a smaller area of overlap with the source bus line 18, than the parasitic capacitance between the source bus line 18 and the pixel electrode 21 that has a larger area of overlap with the source bus line 18.

Figure 11:
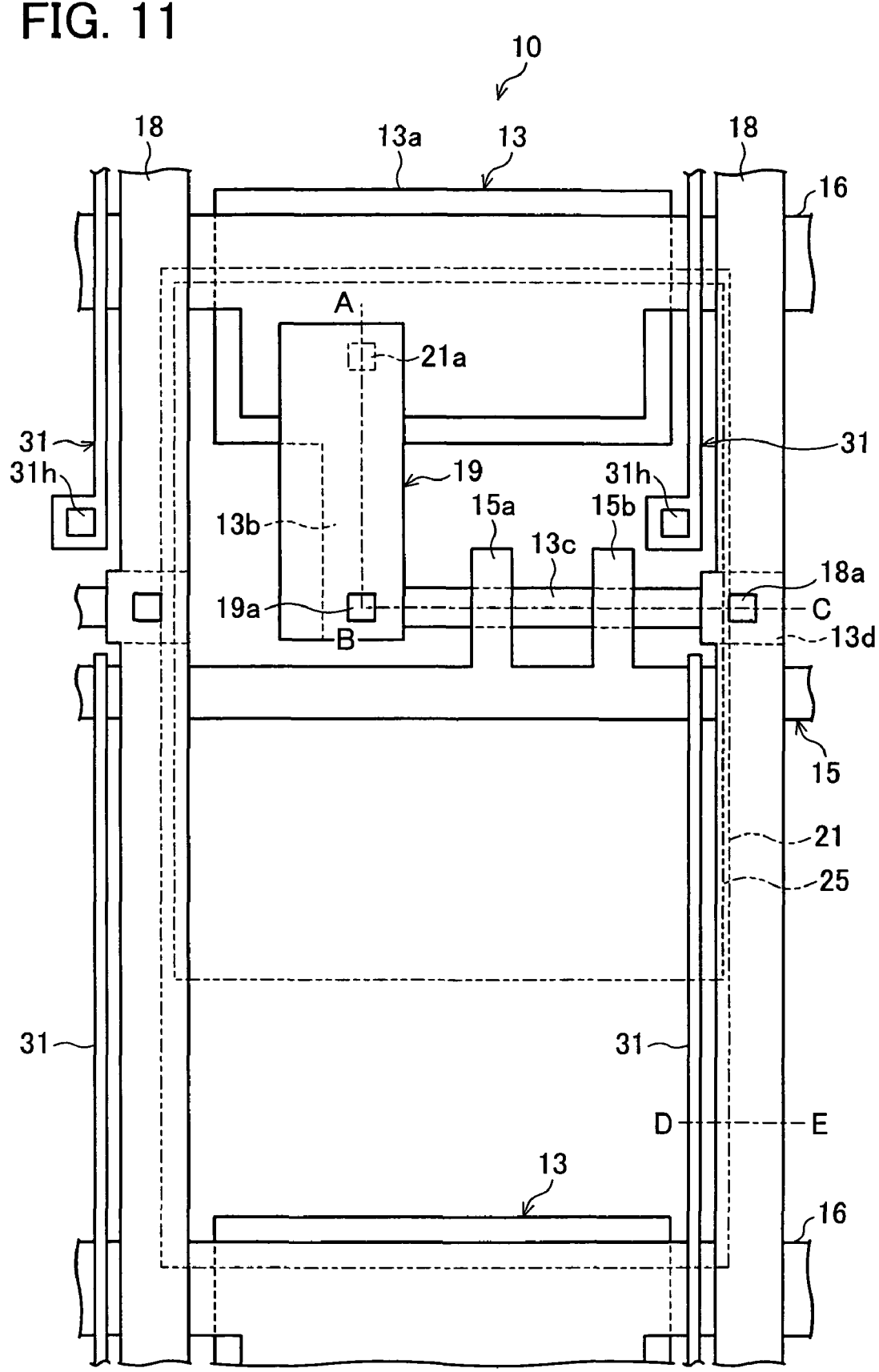
FIG. 11 is a plan view illustrating an arrangement example of the display panel of the liquid crystal display device in accordance with the present invention, where the shield electrode is made of the same material as the source bus line, and is connected to an arbitrary electrode other than the source bus line.

As another example, instead of being provided in a floating position, the shield electrode 31 may, as in the case of FIG. 6, be connected to an arbitrary line (including an electrode) other than the source bus line 18, as shown in FIG. 11.

[Embodiment 3]

Figure 12:
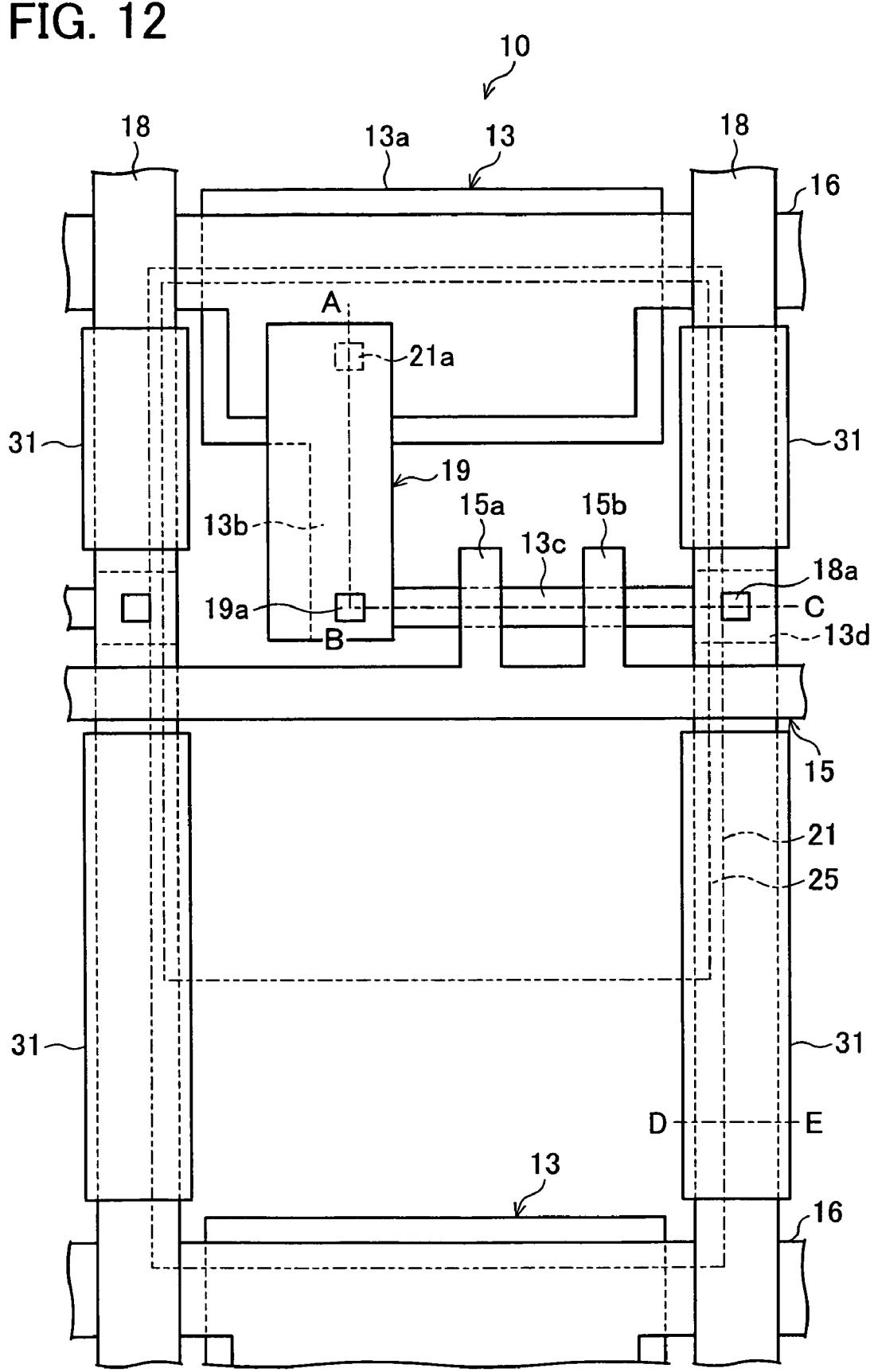
FIG. 12 is a plan view illustrating an arrangement example of the display panel of the liquid crystal display device in accordance with the present invention, where the shield electrode is made of an arbitrary material, and is provided in a floating position.
Figure 13:
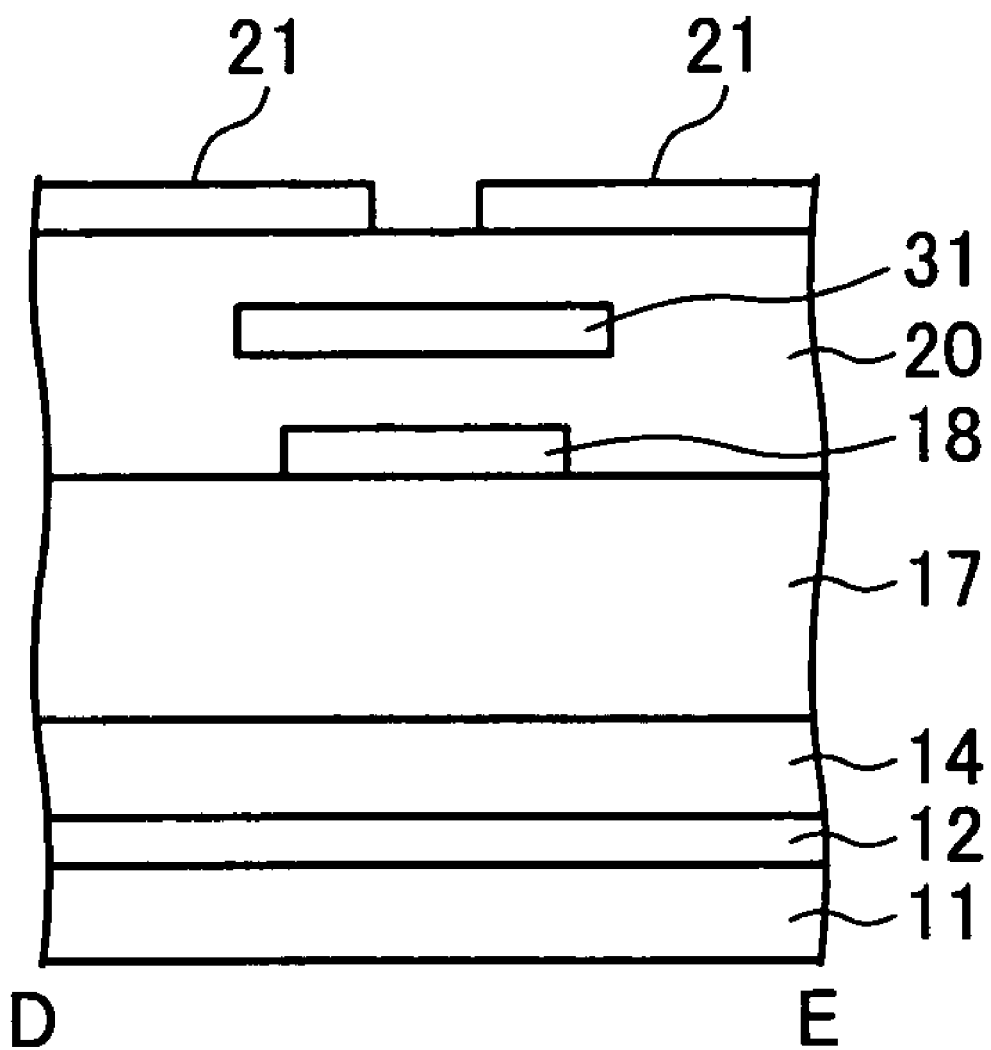
FIG. 13 is a cross-sectional view illustrating an arrangement example of the display panel of the liquid crystal display device in accordance with the present invention, where the shield electrode is made of an arbitrary material.

In the present embodiment, as shown in FIGS. 12 and 13, the shield electrode 31 is provided between the source bus line 18 and the pixel electrode 21. Therefore, the shield electrode 31 has a greater effect of shutting off an electric field generated between the source bus line 18 and the pixel electrode 21. As a result, it is possible to reduce the capacitance between the source bus line 18 and the pixel electrode 21 more saliently.

In order to form such a shield electrode 31, the formation of the resin layer 20 in the foregoing manufacturing process may be divided into a first half and a second half, and the material of the shield electrode 31 may be laminated between the first half and the second half.

Figure 14:
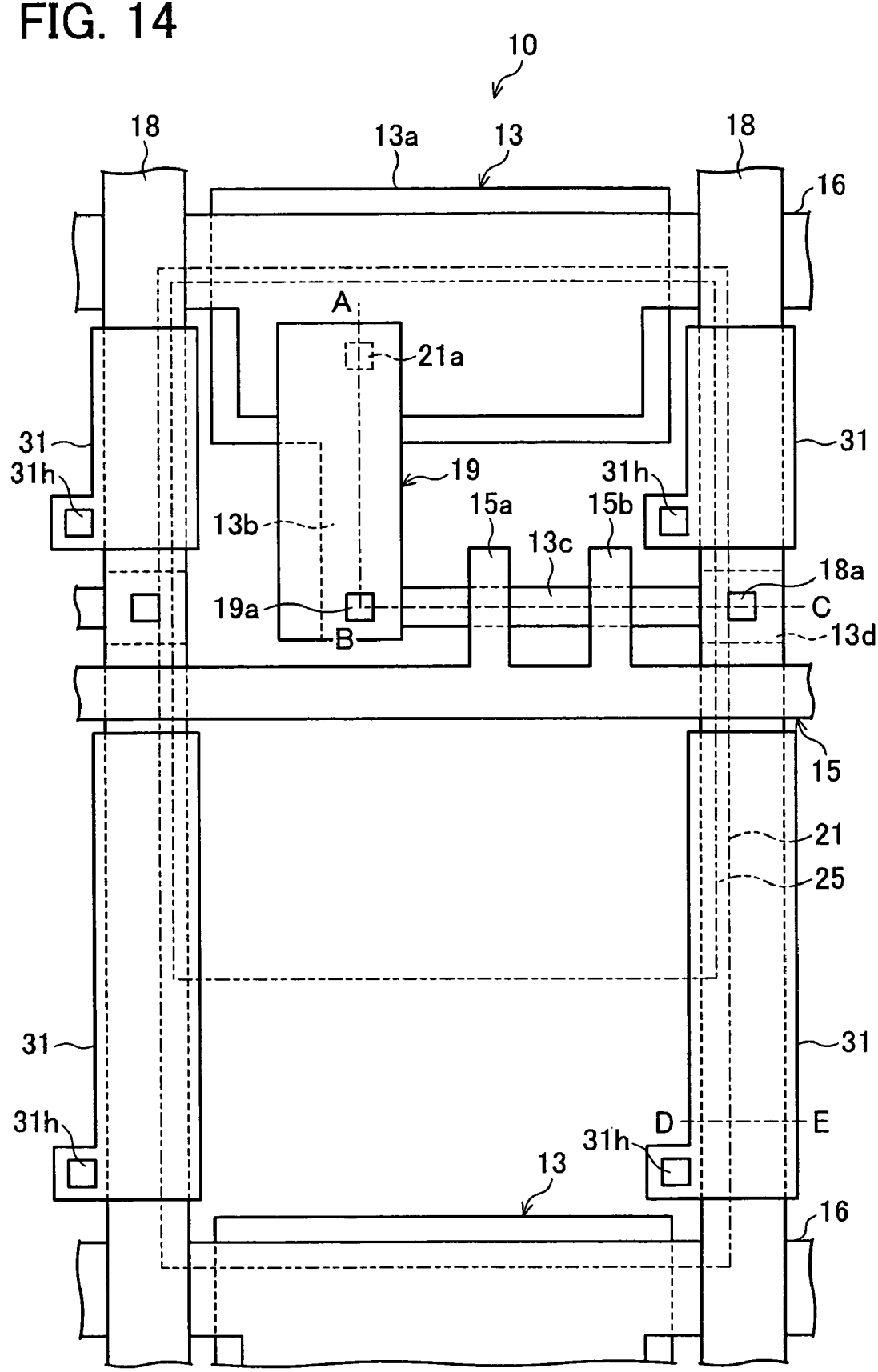
FIG. 14 is a plan view illustrating an arrangement example of the display panel of the liquid crystal display device in accordance with the present invention, where the shield electrode is made of an arbitrary material, and is connected to an arbitrary material other than the source bus line.

The shield electrode 31 may be provided in a floating position, or, as in the case of FIG. 6, the shield electrode 31 may be connected to an arbitrary line (including an electrode) other than the source bus line 18, as shown in FIG. 14.

The rest of the manufacturing process is omitted, because it is the same as the manufacturing process described with reference to FIGS. 2 to 4.

[Embodiment 4]

Figure 15:
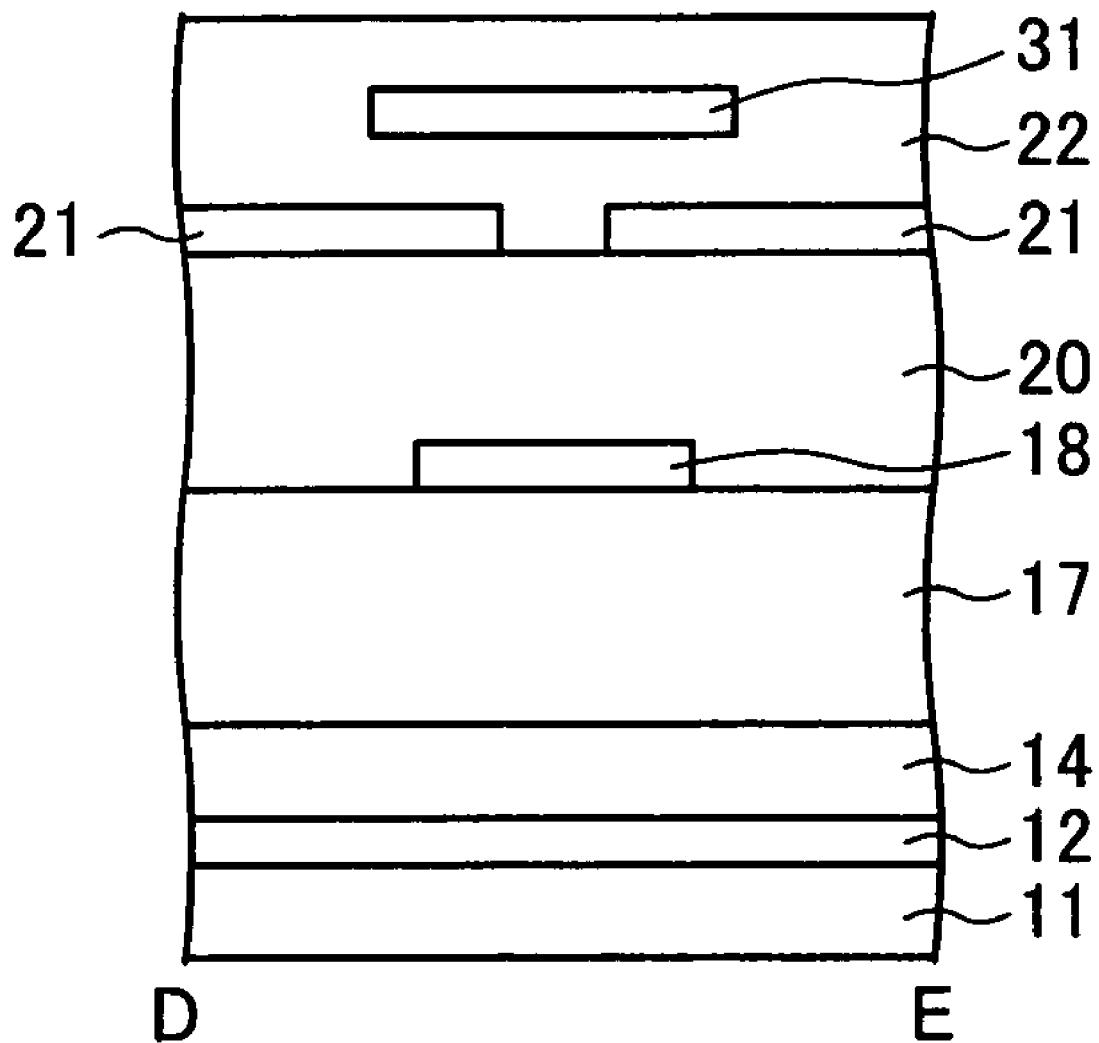
FIG. 15 is a cross-sectional view illustrating an arrangement example of the display panel of the liquid crystal display device in accordance with the present invention, where the shield electrode is made of an arbitrary material.

In the present embodiment, as shown in FIGS. 12 and 15, the shield electrode 31 is provided so as to face one side of the pixel electrode 21, and the source bus line 18 is provided so as to face the other side of the pixel electrode 21. Therefore, it is not necessary to provide a shield electrode to the other side of the pixel electrode 21. As a result, it is possible to increase design freedom concerning the other side of the pixel electrode 21.

In order to form such a shield electrode 31, the formation of the resin layer 22 performed after the formation of the pixel electrode 21 in the foregoing manufacturing process may be divided into a first half and a second half, and the material of the shield electrode 31 may be laminated between the first half and the second half.

The shield electrode 31 may be provided in a floating position, or, as in the case of FIG. 6, the shield electrode 31 may be connected to an arbitrary line (including an electrode) other than the source bus line 18.

The rest of the manufacturing process is omitted, because it is the same as the manufacturing process described with reference to FIGS. 2 to 4.

The present invention is applicable to such purposes as displaying various information by a liquid crystal display device.

[Embodiment 5]

Figure 16:
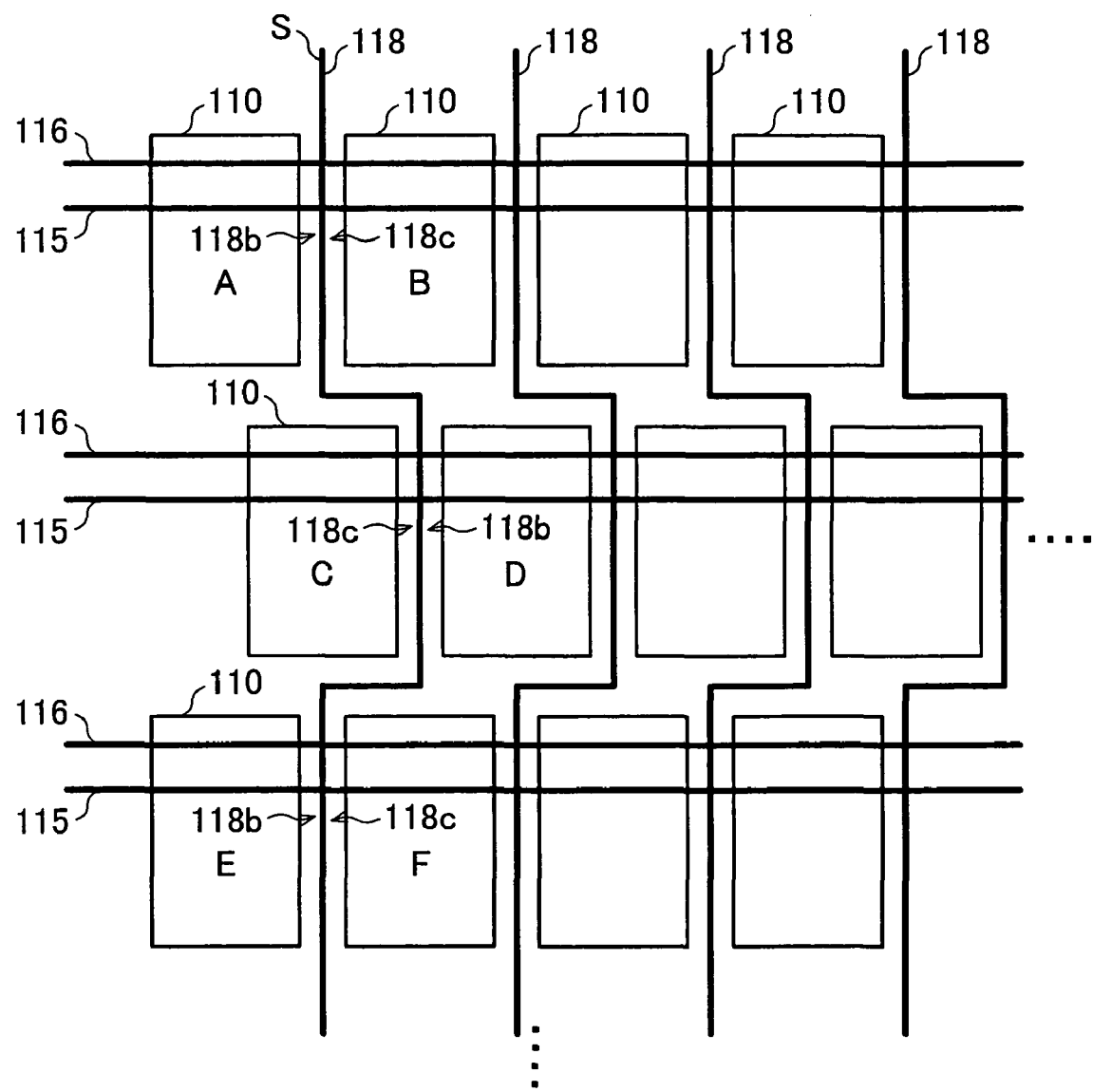
FIG. 16 is a plan view illustrating an arrangement example of the display panel of the liquid crystal display device in accordance with the present invention.
Figure 17:
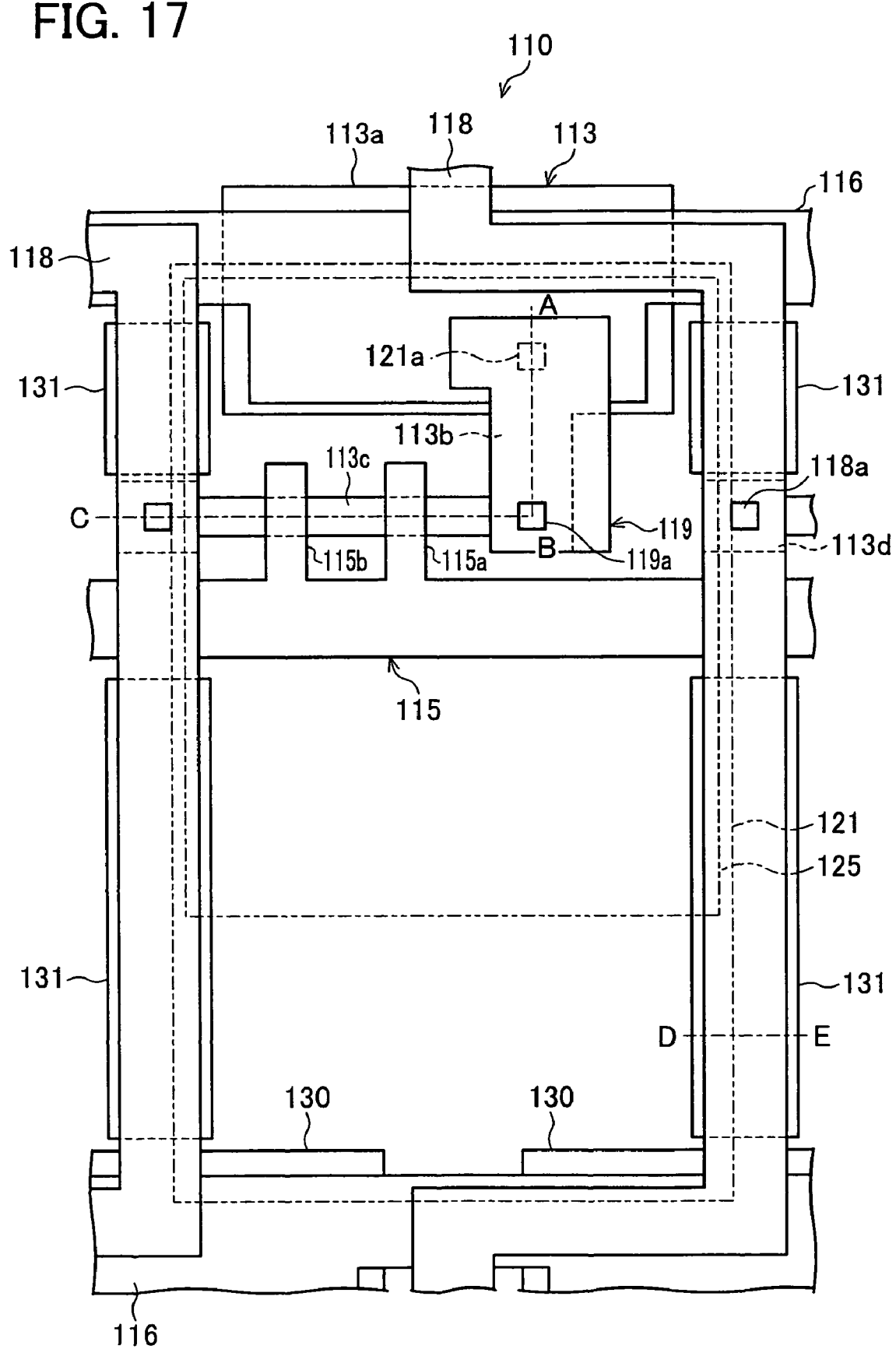
FIG. 17 is a plan view illustrating an arrangement example of the display panel of the liquid crystal display device in accordance with the present invention, where the shield electrode is made of the same material as the gate bus line, and is provided in a floating position.
Figure 18:
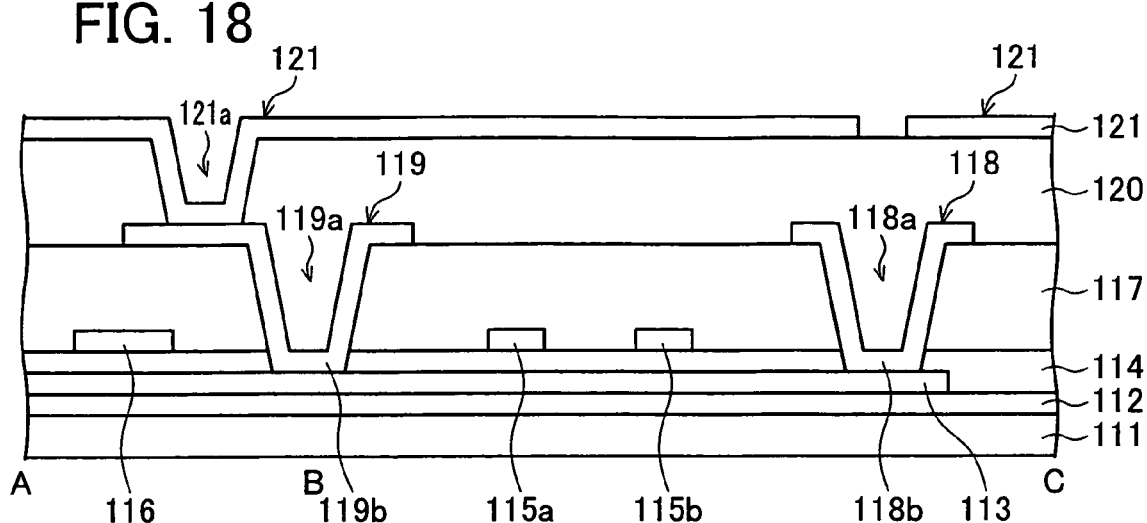
FIG. 18 is a cross-sectional view illustrating an arrangement example of the display panel of the liquid crystal display device in accordance with the present invention.

A display device of the present embodiment is a liquid crystal display device that performs color display by delta arrangement. The display device is an active matrix liquid crystal display device whose display pixel section 110 is provided with a gate bus line 115, a source bus line 118, an auxiliary capacitance line 116, a pixel electrode 121, and an opposed electrode (not shown), as shown in FIGS. 16 to 18. The pixel electrode 121 is provided within a region surrounded by the gate bus line and the source bus line, and the pixel electrode 121 receives a data signal from the source bus line. The opposed electrode is opposed to the pixel electrode, with a liquid crystal layer in between. The source bus line 118 may be provided so as to overlap with the pixel electrode 121, with an insulating film in between. The reference numeral 125 indicates a reflection electrode.

The source bus line 118 has a continuous S-bend shape and is provided with convex regions 118b and concave regions 118c. For the purpose of explanation, suppose that a signal travels downward (a direction orthogonal to horizontal lines) in FIG. 16. At a position where the signal turns right (left, in FIG. 16), a convex region 118b is provided on the right, and a concave region 118c is provided on the left. At a position where the signal turns left (right, in FIG. 16), a convex region 118b is provided on the left, and a concave region 118c is provided on the right. The source bus line 118 applies a data signal only to a pixel electrode 121 opposed to a convex region 118b. Take, for example, a source bus line S of FIG. 16. Among pixel electrodes 121, A, D, and E are respectively located at convex regions 118b of the source bus line S, and B, C, and F are respectively located at concave regions 118c of the source bus line S. Therefore, the source bus line S applies a data signal to A, D, and E, but not to B, C, and F.

Figure 19:
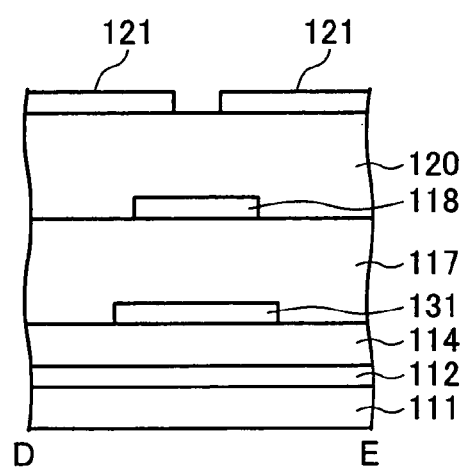
FIG. 19 is a cross-sectional view illustrating an arrangement example of the display panel of the liquid crystal display device in accordance with the present invention, where the shield electrode is made of the same material as the gate bus line.

The portions A through E in FIG. 17 respectively correspond to the portions A through E in FIGS. 18 and 19.

The reference numeral 116 indicates an auxiliary capacitance line.

The reference numeral 113 indicates an Si semiconductor layer including regions 113a, 113b, 113c, and 113d respectively overlapping with the auxiliary capacitance line 116, a drain electrode 119, gate electrodes 115a and 115b, and a source electrode of the source bus line 118.

The source bus line 118 is connected to the Si semiconductor layer 113 at a contact hole 118a.

The reference numeral 119 indicates the drain electrode, which is connected to the pixel electrode 121 and the region 113c through a contact hole 121a and a contact hole 119a, respectively.

In the present embodiment, a shield electrode 131 is provided in the vicinity of the pixel electrode 121 and the source bus line 118. The shield electrode 131 is formed so as to reduce a source-drain parasitic capacitance (Csd) between the pixel electrode 121 and the source bus line 118 (hereinafter simply referred to as "parasitic capacitance").

A shield electrode is a conductor in general having a function of shutting off an electric field generated between other electrodes. Therefore, the shield electrode includes not only an electrode connected to a line for supplying a potential (e.g. gate bus line), but also an electrode not connected to a line for supplying a potential (e.g. so-called floating state). The conductor in general includes not only a good conductor such as a metal film, but also a P-doped n+ semiconductor, for example.

As described above, the pixel electrode 121 is provided so as to overlap with the source bus line 118. Therefore, when a data signal is applied to the source bus line 118 in order to display an image, an electric field is generated between the pixel electrode 121 and the source bus line 118. The electric field forms a parasitic capacitance at a position where the pixel electrode 121 and the source bus line 118 overlap. In the present embodiment, the shield electrode 131, which is made of insulator or semiconductor, is provided in such a position as to be detached (i.e. insulated) from the pixel electrode 121 and the source bus line 118. In this way, the shield electrode 131 carries out a function of shutting the electric field off, thereby reducing the parasitic capacitance.

In the vicinity of the source bus line 18, electric fields are generated not only in a region sandwiched between the pixel electrode 121 and the source bus line 118, but also in all directions, due to the signal applied to the source bus line 118. There is an electric field also in a direction opposite the pixel electrode 121, seen from the source bus line 118. Since the pixel electrode 121 is in the vicinity of the source bus line 118, this electric field is also applied to the pixel electrode 121. Therefore, by thus providing the shield electrode 131 at the position where the electric field is generated, the shield electrode 131 can shut off the electric field applied from the source bus line 118 to the pixel electrode 121 as described above. In other words, the shield electrode 131 can reduce the capacitance formed between the pixel electrode 121 and the source bus line 118. It is well-known that, in general, a capacitance is influenced by the properties of a space in which an electric field can exist between two conductors. In the present embodiment, this space is transformed into a space in which electric flux lines emitted from the source bus line do not enter into the pixel electrode 121 easily. This is nothing but a reduction of the capacitance.

As described above, the present embodiment is a liquid crystal display device that performs color display by delta arrangement. In the following description, colors respectively displayed by pixels are referred to as R (red), G (green), and B (blue). Source bus lines for applying data signals for R, G, and B are simply referred to as R-line, G-line, and B-line. As described above, structurally, a pixel electrode and a source bus line overlap at a certain position, with an insulating film in between. Therefore, there is a source-drain parasitic capacitance. Suppose that a capacitance between a pixel electrode and a source bus line that drives the pixel (a capacitance with a G-line) is Csd1, and a capacitance between a pixel electrode and a source bus line that does not drive the pixel (a capacitance with an R-line or a B-line) is Csd2. The potential of the G-pixel is attracted through these capacitances when the potentials of the source bus line fluctuate. The G-pixel sandwiched between an R-line and a G-line is attracted to the R-line and the G-line, and the G-pixel sandwiched between a G-line and a B-line is attracted to the G-line and the B-line. The attraction by the G-line is the same in both cases. On the other hand, the attraction by the R-line and the attraction by the B-line are not always equal. Therefore, horizontal stripes are generated by the difference between the attraction by the R-line and the attraction by the B-line. The attraction by these lines (the R-line and the B-line) are caused through source-drain parasitic capacitances Csd2. Thus, reduction of Csd2 means reduction of the horizontal lines. This relationship is applicable not only to the case of G-pixel, but also to the case of R-pixel or B-pixel. By reducing Csd2, it is possible to reduce the horizontal lines occurring on a display panel of delta arrangement or the like.

This relationship is represented by the following formula:

$$Vpix=Vs0+(Csd1/Cpix)\times\Delta Vs1+(Csd2/Cpix)\times\Delta Vs2$$

where Vpix is a potential of a pixel electrode after attraction, Vs0 is a potential of a pixel electrode before attraction (=potential applied to the pixel electrode through a TFT from a source bus line that applies a data signal), Csd1 is a parasitic capacitance between an arbitrary pixel electrode and a source bus line that applies a data signal thereto, Csd2 is a parasitic capacitance between an arbitrary pixel electrode and a source bus line that does not apply a data signal thereto, Cpix is a sum of all capacitances (parasitic capacitances, auxiliary capacitances, etc.) of an arbitrary pixel electrode, $\Delta Vs1$ is a voltage amplitude of a source bus line that applies a data signal to an arbitrary pixel electrode, and $\Delta Vs2$ is a voltage amplitude of a source bus line that does not apply a data signal to an arbitrary pixel electrode. In order to reduce the horizontal lines, it is necessary to reduce the difference in Vpix of each horizontal line. It can be assumed that the first term and the second term of the right side of the formula is approximately constant, regardless of the horizontal line. On the other hand, the third term is different with respect to each horizontal line, because $\Delta Vs2$ is different, as described above. Here, it can be assumed that Cpix and $\Delta Vs2$ in the third term cannot be changed. By reducing Csd2, however, it is possible to make the difference between the third term for one horizontal line and the third term for another horizontal line smaller, and thereby make a corresponding difference in Vpix smaller.

As described above, if at least Csd2 can be reduced, it is possible to make the difference in Vpix for one horizontal line and Vpix for another horizontal line smaller, and thereby make a corresponding difference in amount of attracted pixel potential smaller. In the present embodiment, not only Csd2, but also Csd1 is reduced by providing the shield electrode 131. This arrangement also allows for making the difference in Vpix for one horizontal line and Vpix for another horizontal line smaller, and thereby making a corresponding difference in amount of attracted pixel potential smaller.

In the present embodiment, as shown in FIG. 17, the shield electrode 131 is a flat rectangle extending along the longitudinal direction of the source bus line 118 (the direction orthogonal to horizontal lines).

In the present embodiment, as shown in FIG. 19, the shield electrode 131 is provided so as to face one side of the source bus line 118 (i.e. provided to the lower side of FIG. 19), and the pixel electrode 121 is provided so as to face the other side of the source bus line 118. Here, the shield electrode 131 is provided so as to sandwich an interlayer insulating film 117, which is an insulating layer provided below the source bus line 118.

As shown in FIGS. 18 and 19, the source bus line 118 is provided so as to overlap with two pixel electrodes 121. Here, the center of the shield electrode 131 in the longitudinal direction (the direction orthogonal to horizontal lines) corresponds to the center of the source bus line 118 in the longitudinal direction. In other words, the shield electrode 131 is symmetrical with respect to a plane (not shown; plane S) that passes through the center of the source bus line 118 and that is orthogonal to horizontal lines. As a result, in the present embodiment, the parasitic capacitances between the source bus line 118 and both the pixel electrodes 121 are reduced equally.

In the present embodiment, the shield electrode 131 and the gate bus line 115 are provided in the same layer. Moreover, in the present embodiment, the shield electrode 131 and the gate bus line 115 are made of the same material. Therefore, it is not necessary to use different materials. Accordingly, it is possible to cut down the increase of the manufacturing cost caused by providing the shield electrode 131.

In the present embodiment, the shield electrode 131 is provided in a floating position. The floating position is such a position that the shield electrode 131 is completely insulated from any member supplied with any electric signal (potential). In other words, the floating position is such a position that the entire surface of the shield electrode 131 is surrounded by an insulator. With this structure, the shield electrode 131 is like a floating island on an insulator. The shield electrode 131 may be connected to the ground.

A capacitance (hereinafter "shield capacitance") is formed also between the shield electrode 131 and the source bus line 118. For a source driver (not shown), this capacitance is also a load. However, if the shield electrode 131 is provided in the floating position, it is possible to prevent this capacitance from increasing. Accordingly, it is possible to reduce power consumption.

Moreover, if the shield electrode 131 is provided in the floating position, it is not necessary to worry about how to connect the shield electrode 131 to other lines. Accordingly, design freedom can be increased.

The following describes a method for manufacturing a liquid crystal display device. Before discussing a manufacturing procedure for the present embodiment, the following describes a manufacturing procedure for a commonly adopted structure.

Figure 41:
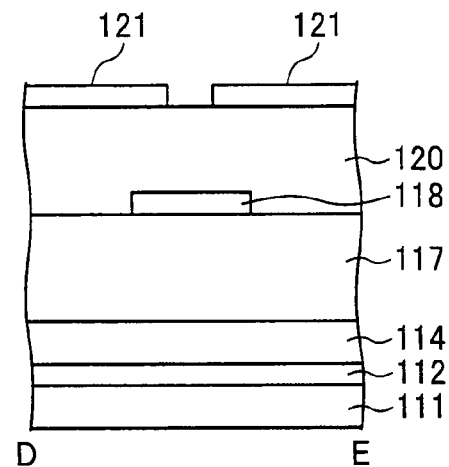
FIG. 41 is a cross-sectional view illustrating an arrangement example of a display panel of a conventional liquid crystal display device.
Figure 42:
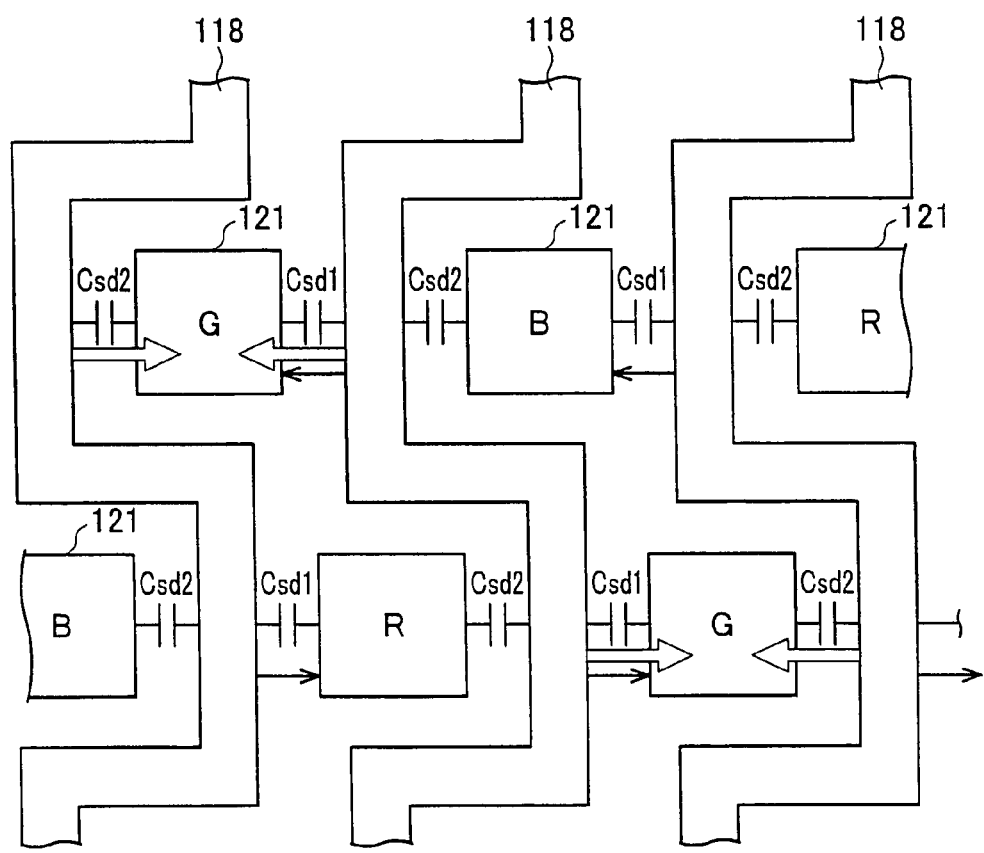
FIG. 42 is a schematic diagram illustrating how source-drain parasitic capacitances are formed.

First, as shown in FIGS. 18 and 41, a base coat 112 is deposited by plasma CVD onto a glass substrate (insulating substrate) 111. The base coat 112 is made of $SiO_2$, and the thickness of the base coat 112 is 100 nm.

Next, onto the base coat 112, an Si semiconductor layer 113 (e.g. a silicon layer) is deposited by plasma CVD. The thickness of the Si semiconductor layer 113 is 50 nm. The Si semiconductor layer 113 is recrystallized by laser annealing (heat processing). Then, the Si semiconductor layer 113 is patterned into a predetermined flat shape.

Onto the Si semiconductor layer 113, a gate insulating film 114 is deposited by plasma CVD. The gate insulating film 114 is made of $SiO_2$, and the thickness of the gate insulating film 114 is 100 nm.

On the gate insulating film 114, conductive materials GE, which include a tantalum nitride film (thickness: 50 nm) and a tungsten film (thickness: 370 nm), are sequentially deposited by spattering. Then, the conductive materials GE are patterned into predetermined patterns, so as to form an auxiliary capacitance line 116 and a gate bus line 115 (including gate electrodes 115a and 115b). The conductive materials GE may include an element selected from Ta, W, Ti, Mo, Al, and Cu, an alloy material consisting mainly of these elements, or a compound material.

Into the Si semiconductor layer 113, P (phosphorus) is doped from above the gate electrodes 115a and 115b through the gate insulating film 114, so as to turn the Si semiconductor layer 113 into an n− region or an n+ region (a source region and a gate region of a transistor). In this way, a transistor is formed. This is a procedure for forming an N-channel. In order to form a P-channel, B (boron) is doped into the Si semiconductor layer 113.

Further, the impurity element added to the Si semiconductor layer 113 is activated by heat processing.

Further, as an insulating film, an interlayer insulating film 117, which includes a silicon nitride film and a silicon oxide film, is formed (thickness: 950 nm) by CVD.

Then, contact hole sections 118a and 119a are formed through the gate insulating film 114 and the interlayer insulating film 117, respectively. The contact hole sections 118a and 119a reach the drain region and the source region of the transistor section.

After that, conductive materials SE (here, the conductive materials SE and the source bus line are the same material), which include Ti (thickness: 100 nm), Al (thickness: 500 nm), and Ti (thickness: 100 nm), are sequentially deposited by spattering. The conductive materials SE are patterned into predetermined shapes, so as to form the source bus line 118 and the drain electrode 119.

The Si semiconductor layer 113 is hydrogenated by heat processing the foregoing laminate structure. This hydrogenation step is a step of terminating dangling bond of the Si semiconductor layer 113 by using hydrogen contained in the interlayer insulating film 117, which includes the silicon nitride film and the like.

Further, a resin layer 120, which is made of organic insulating material, is formed on the interlayer insulating film 117, the source bus line 118, and the drain electrode 119. The thickness of the resin layer 120 is 1.6 µm.

Further, a contact hole 121a, which reaches the drain electrode 119, is formed. Then, ITO (indium tin oxide) is deposited (thickness: 100 nm) by spattering, and shaped into predetermined shapes, so as to form a plurality of pixel electrodes 121 arranged in matrix.

After that, an alignment film (not shown) is printed onto the pixel electrodes 121 and the resin layer 120, and rubbing is performed in a predetermined direction. As a result, an active matrix substrate of the present embodiment is completed.

On the alignment-film side of the active matrix substrate, spherical spacers (not shown) are diffused, or a resin insulating film is formed in a column-like shape. Then, an opposed substrate (not shown) is evenly bonded with the active matrix substrate at a predetermined interval. Between the active matrix substrate and the opposed substrate, a liquid crystal layer is sandwiched. On the opposed substrate, an opposed electrode (transparent electrode; not shown) is provided. After an alignment film is printed on the opposed electrode, rubbing is performed in the foregoing manner. In this way, an active matrix liquid crystal display device (display device using an active matrix substrate) is completed.

The following describes a manufacturing method of the present embodiment. Those parts identical to the foregoing commonly adopted procedure are omitted.

As shown in FIGS. 18 and 19, the gate insulating film 114 is provided, and, onto the gate insulating film 114, the conductive materials GE are sequentially deposited by spattering. Then, the conductive materials GE, the auxiliary capacitance line 116, and the gate bus line 115 (including the gate electrodes 115a and 115b) are patterned into a predetermined shape, so as to form the shield electrode 131.

Thus, by simply changing the patterned shape of the gate bus line 115, the shield electrode 131 can be formed by the existing manufacturing process. Therefore, even though the shield electrode 131 is provided as a new member, it is possible to cut down the increase of the manufacturing cost.

The present invention is also applicable to a top gate structure and to an inversely staggered structure.

Figure 20:
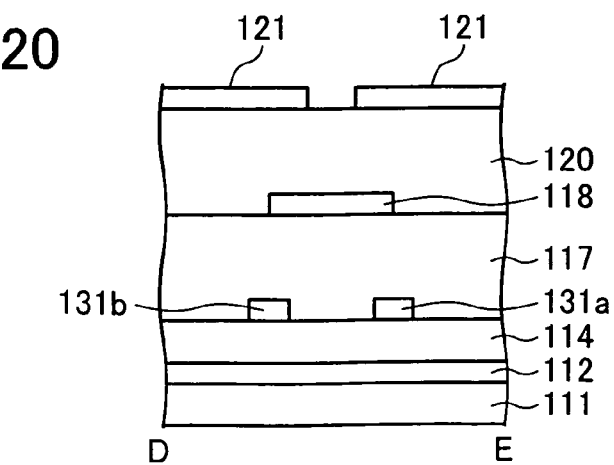
FIG. 20 is a cross-sectional view illustrating an arrangement example of the display panel of the liquid crystal display device in accordance with the present invention, where the shield electrode is made of the same material as the gate bus line.

As shown in FIG. 20, shield electrodes 131a and 131b may be provided. The shield electrodes 131a and 131b are those portions of the shield electrode 131 of FIG. 19 that remain after the portion including the center of the shield electrode 131 in the longitudinal direction is removed. Like the shield electrode 31 of FIG. 19, the shield electrodes 131a and 131b are symmetrical with respect to the plane S.

This arrangement can reduce the area where the shield electrodes and the source bus line 118 overlap. Accordingly, it is possible to reduce the shield capacitance.

Figure 21:
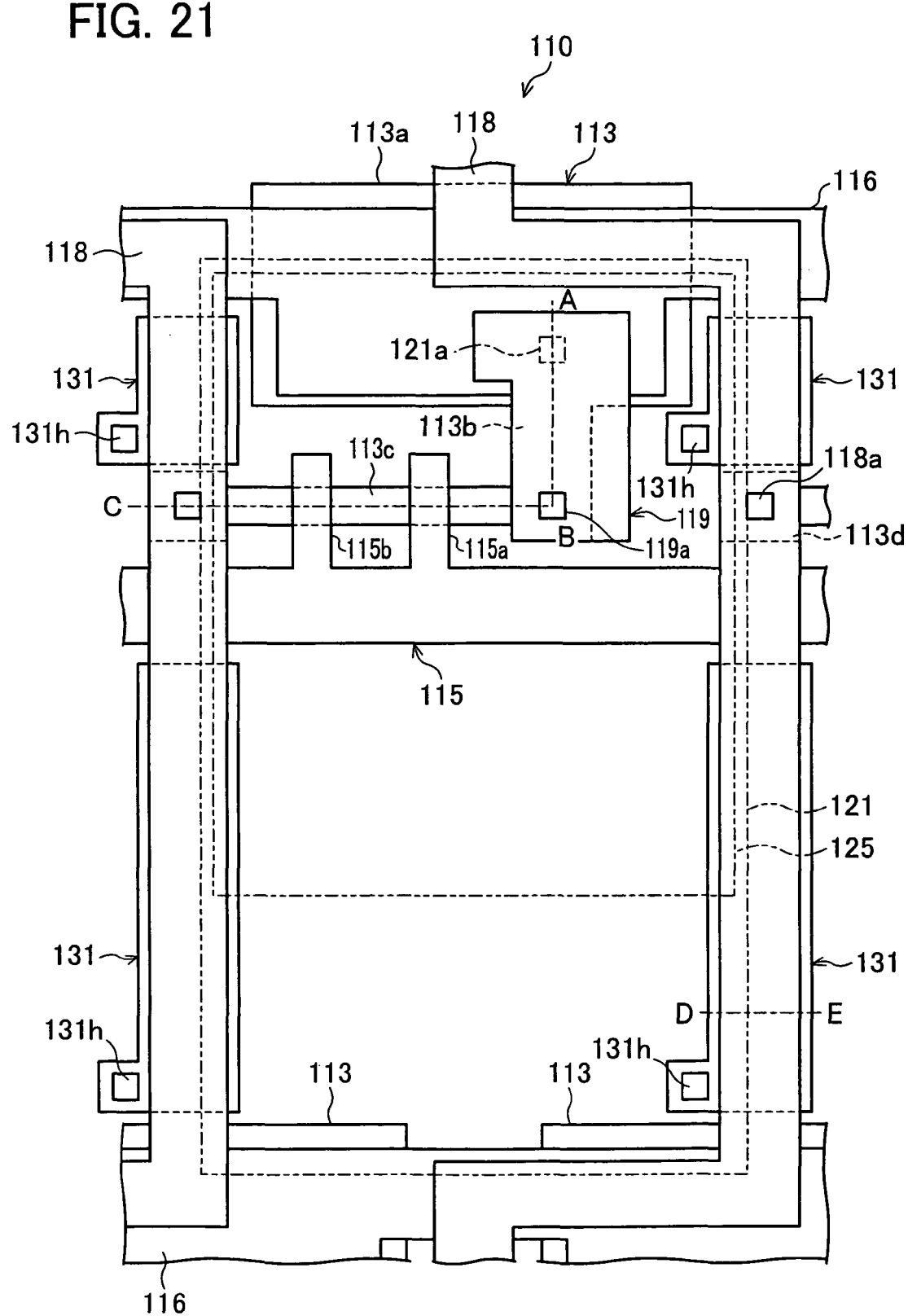
FIG. 21 is a plan view illustrating an arrangement example of the display panel of the liquid crystal display device in accordance with the present invention, where the shield electrode is made of the same material as the gate bus line, and is connected to an arbitrary electrode other than the source bus line.

As another example, instead of being provided in a floating position, the shield electrode 131 may be connected to an arbitrary line (including an electrode) other than the source bus line 118, as shown in FIG. 21. The shield electrode 131 may be connected to the line through a contact hole 131h. The contact hole 131h can be formed by forming a hole that reaches the line on the surface where the shield electrode 131 is to be formed, and appropriately changing the patterning for forming the shield electrode.

With this arrangement, it is likely that the potential of the shield electrode 131 is different from the potential of the source bus line 118. Therefore, it is possible to strengthen the electric field between the shield electrode 131 and the source bus line 118 more certainly than in the case in which the shield electrode is provided like a floating island. As a result, it is possible to reduce the capacitance between the source bus line 118 and the pixel electrode 121 more saliently.

For example, the shield electrode 131 is at least at certain time or always connected to another line whose potential is different from the potential of the source bus line. The another line may have a constant potential during a period in which the potential of the source bus line is constant, or may have a potential that changes at the timing when the potential of the source bus line changes.

The another line may always keep a constant potential.

Figure 22:
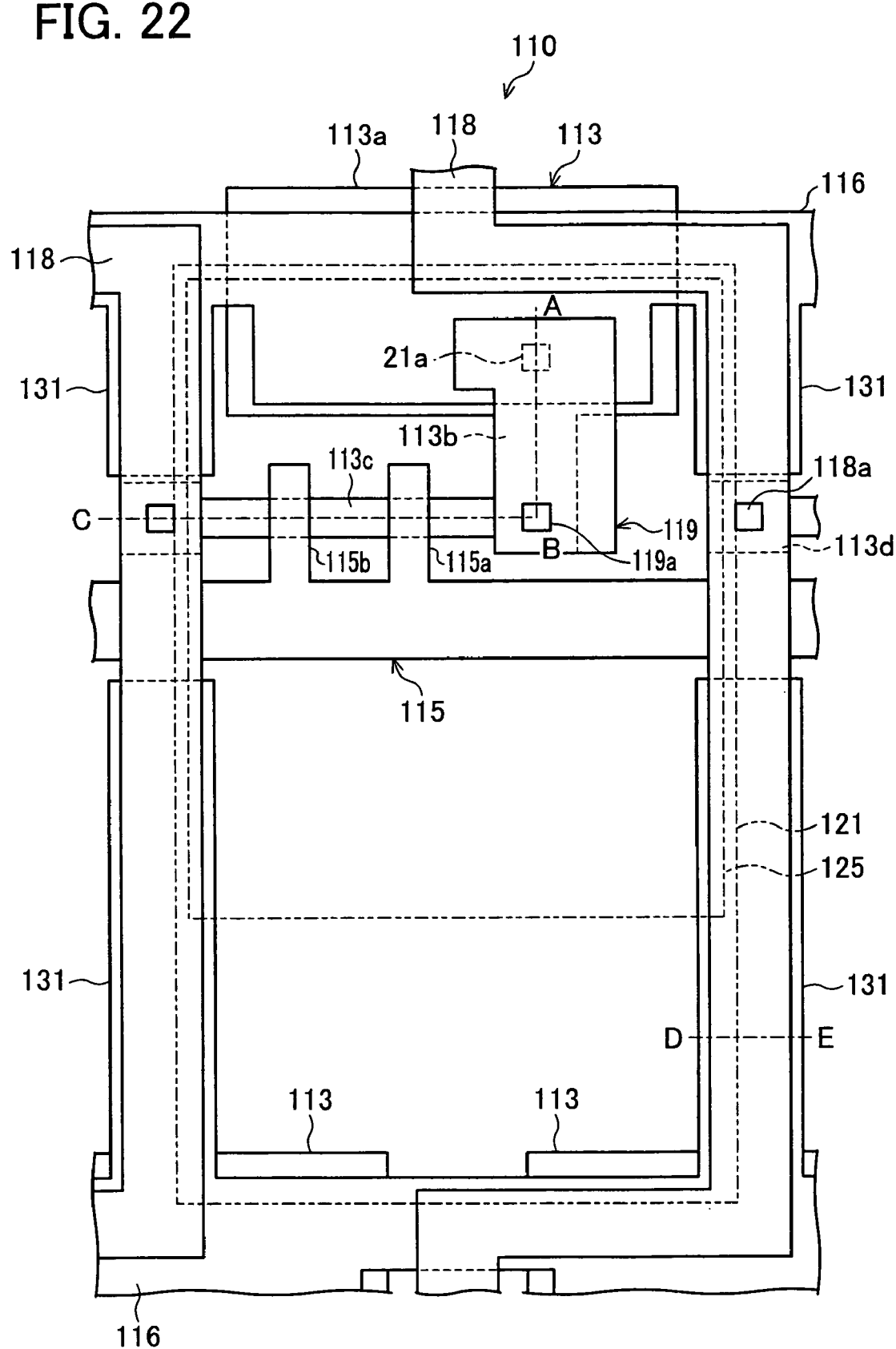
FIG. 22 is a plan view is a plan view illustrating an arrangement example of the display panel of the liquid crystal display device in accordance with the present invention, where the shield electrode is made of the same material as the gate bus line, and is connected to an auxiliary capacitance line.

As shown in FIG. 22, the shield electrode 131 may be connected to the auxiliary capacitance line 116, which is an arbitrary line other than the source bus line 118.

[Embodiment 6]

Figure 23:
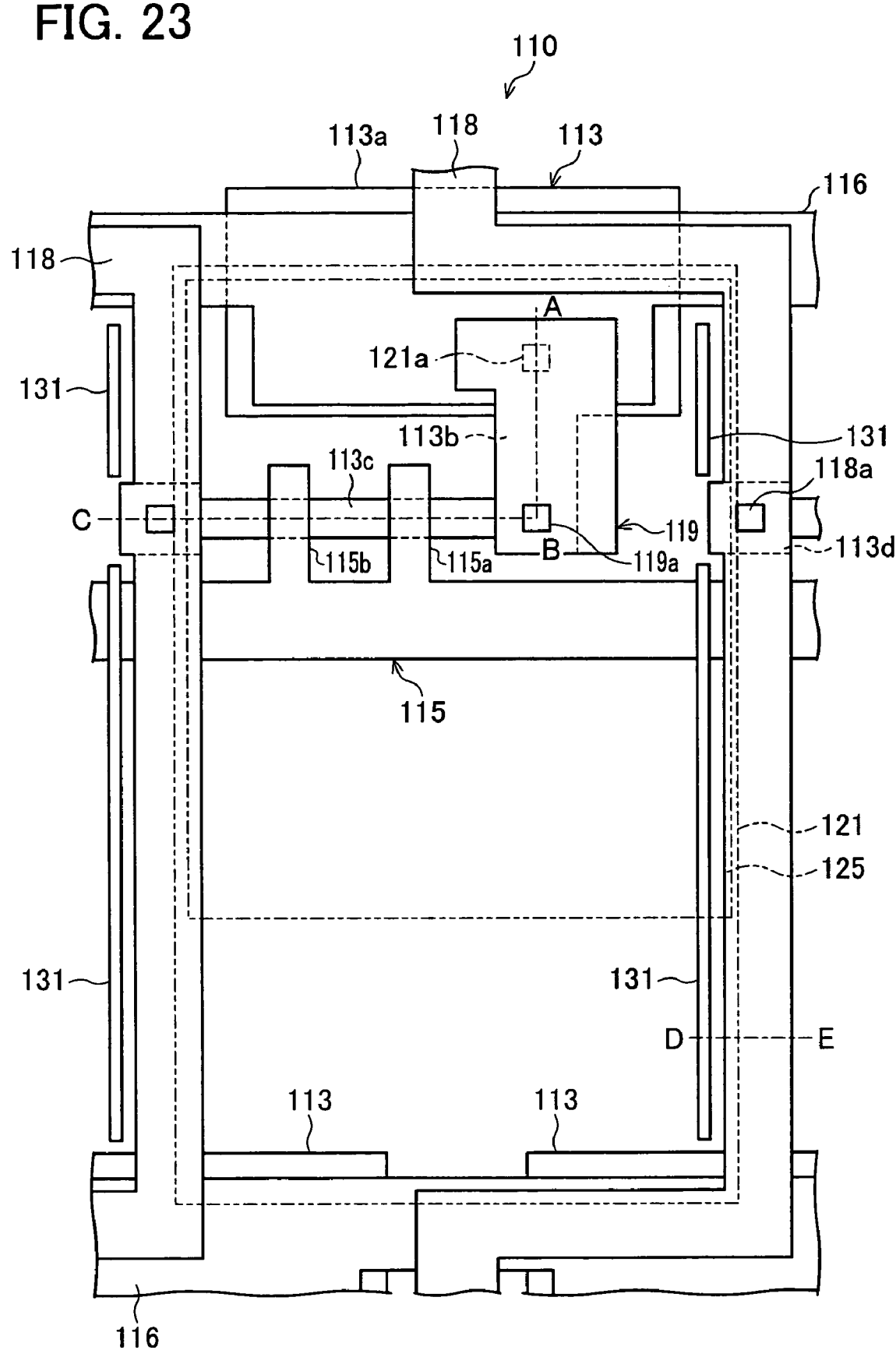
FIG. 23 is a plan view illustrating an arrangement example of the display panel of the liquid crystal display device in accordance with the present invention, where the shield electrode is made of the same material as the source bus line, and is provided in a floating position.
Figure 24:
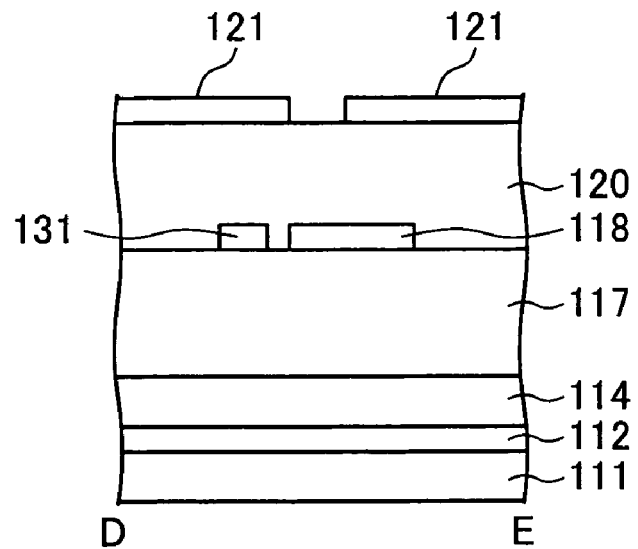
FIG. 24 is a cross-sectional view illustrating an arrangement example of the display panel of the liquid crystal display device in accordance with the present invention, where the shield electrode is made of the same material as the source bus line.

In the present embodiment, as shown in FIGS. 23 and 24, the center of the source bus line 118 in the longitudinal direction (the direction orthogonal to horizontal lines) does not correspond to the center (center G) of the distance between the two pixel electrodes 121 that are on the same horizontal line and are closest to the source bus line 118. The area of overlap between the source bus line 118 and one of the two pixel electrodes 121 is different from the area of overlap between the source bus line 118 and the other of the two pixel electrodes 121. Specifically, the area of overlap between the source bus line 118 and the pixel electrode 121 on the left is smaller than the area of overlap between the source bus line 118 and the pixel electrode 121 on the right (see FIG. 24). The area of overlap between the source bus line 118 and the pixel electrode 121 on the left (see FIG. 24) may be zero.

The shield electrode 131 and the source bus line 118 are provided in the same layer. The shield electrode 131 is provided along the longitudinal direction of the source bus line 118, in the vicinity of the pixel electrode farther from the source bus line 118 (the pixel electrode 121 on the left in FIG. 24). More specifically, the shield electrode 131 is provided directly below the pixel electrode 121, with the resin layer 120 in between.

In the present embodiment, the shield electrode 131 and the source bus line 118 are made of the same material. Therefore, it is not necessary to use different materials. Accordingly, it is possible to cut down the increase of the manufacturing cost caused by providing the shield electrode 131.

As described above, in the present embodiment, the shield electrode 131 and the gate bus line 118 are provided in the same layer. As a result, by simply changing the patterned shape of the gate bus line 118, the shield electrode 131 can be formed by the existing manufacturing process. Therefore, even though the shield electrode 131 is provided as a new member, it is possible to cut down the increase of the manufacturing cost.

In the present embodiment, the shield electrode 131 is provided in the floating position. As a result, as described above, it is possible to cut down the increase of the shield capacitance, and thereby cut off the increase of the power consumption. Moreover, it is possible to increase design freedom.

The rest of the manufacturing process is omitted, because it is the same as the manufacturing process described with reference to FIGS. 17 to 19.

Figure 25:
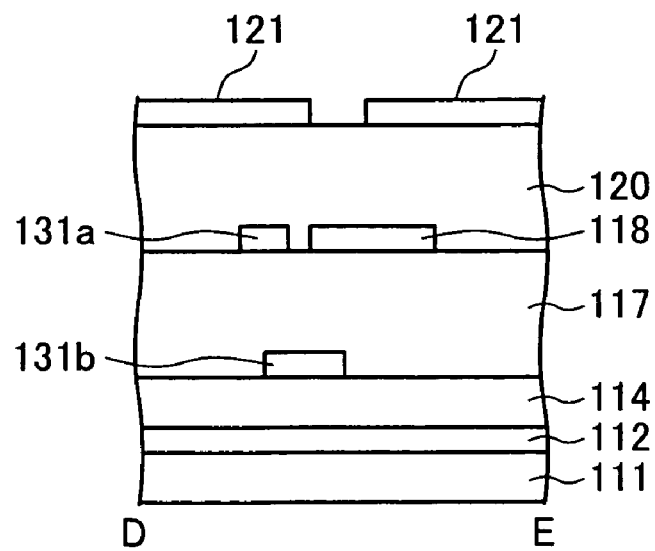
FIG. 25 is a cross-sectional view illustrating an arrangement example of the display panel of the liquid crystal display device in accordance with the present invention, where one shield electrode is made of the same material as the source bus line, and the other shield electrode is made of the same material as the gate bus line.

As shown in FIG. 25, the shield electrode may be the shield electrode 131*a* provided in the same layer as the source bus line 118 like the shield electrode 131 of FIG. 24 and the shield electrode 131*b* provided in the same layer as the gate bus line 115.

In the example of FIG. 25, the center of the shield electrode 131*b* in the longitudinal direction (the direction orthogonal to horizontal lines) does not correspond to the center G, and the area of overlap between the shield electrode 131*b* and one of the two pixel electrodes 121 is different from the area of overlap between the shield electrode 131*b* and the other of the two pixel electrodes 121. Specifically, the area of overlap between the shield electrode 131*b* and the pixel electrode 121 on the left is larger than the area of overlap between the shield electrode 131*b* and the pixel electrode 121 on the right (see FIG. 25). This relationship between the areas of overlap is directly opposite to the case in which the source bus line 118 overlaps the pixel electrodes 121. The area of overlap between the shield electrode 131*b* and the pixel electrode 121 on the right (see FIG. 25) may be zero.

As a result, the shield electrode 131 reduces, to a greater degree, the parasitic capacitance between the source bus line 118 and the pixel electrode 121 that has a smaller area of overlap with the source bus line 118, than the parasitic capacitance between the source bus line 118 and the pixel electrode 121 that has a larger area of overlap with the source bus line 118.

Figure 26:
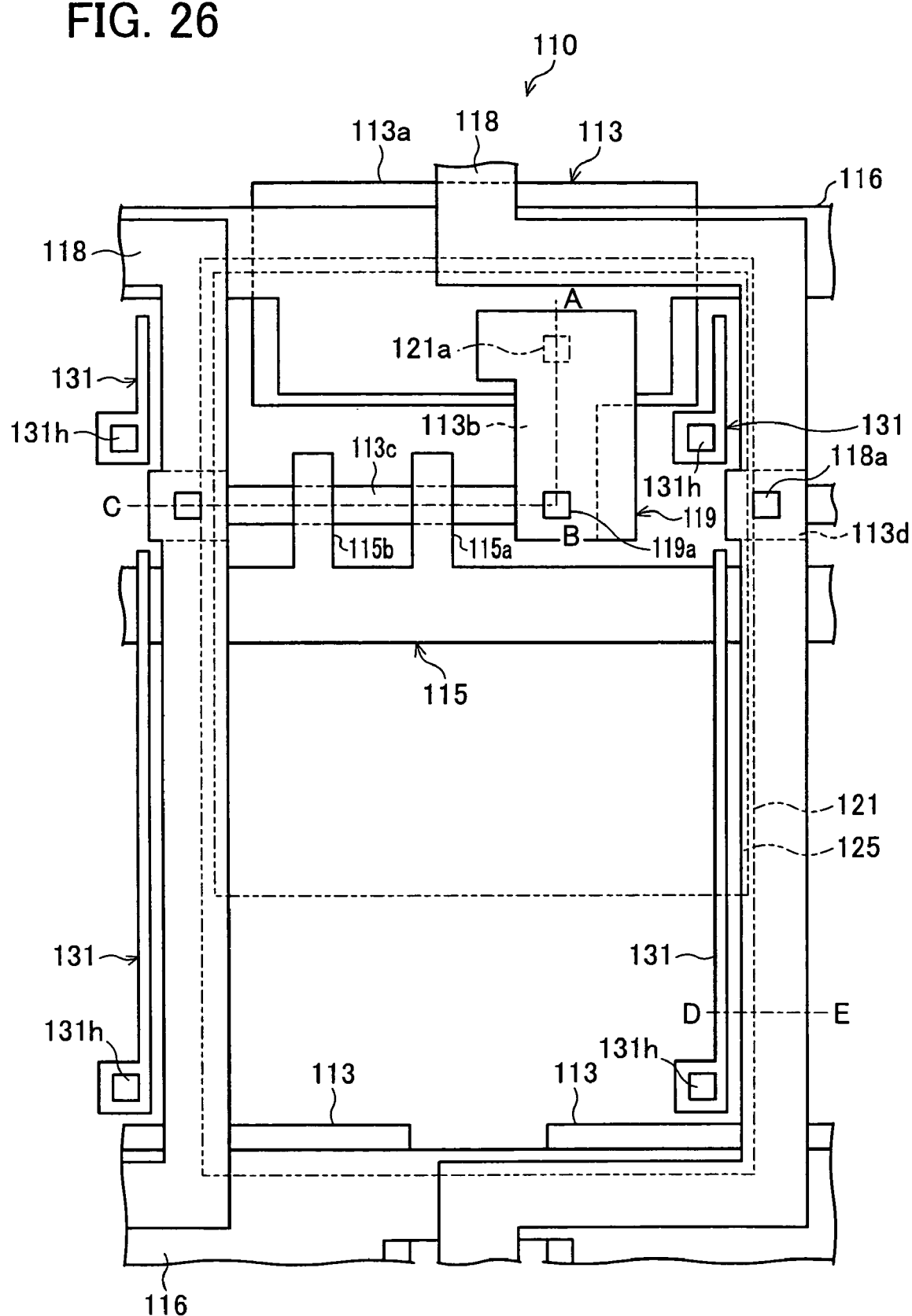
FIG. 26 is a plan view illustrating an arrangement example of the display panel of the liquid crystal display device in accordance with the present invention, where the shield electrode is made of the same material as the source bus line, and is connected to an arbitrary electrode other than the source bus line.

As another example, instead of being provided in a floating position, the shield electrode 131 may, as in the case of FIG. 21, be connected to an arbitrary line (including an electrode) other than the source bus line 118, as shown in FIG. 26.

[Embodiment 7]

Figure 27:
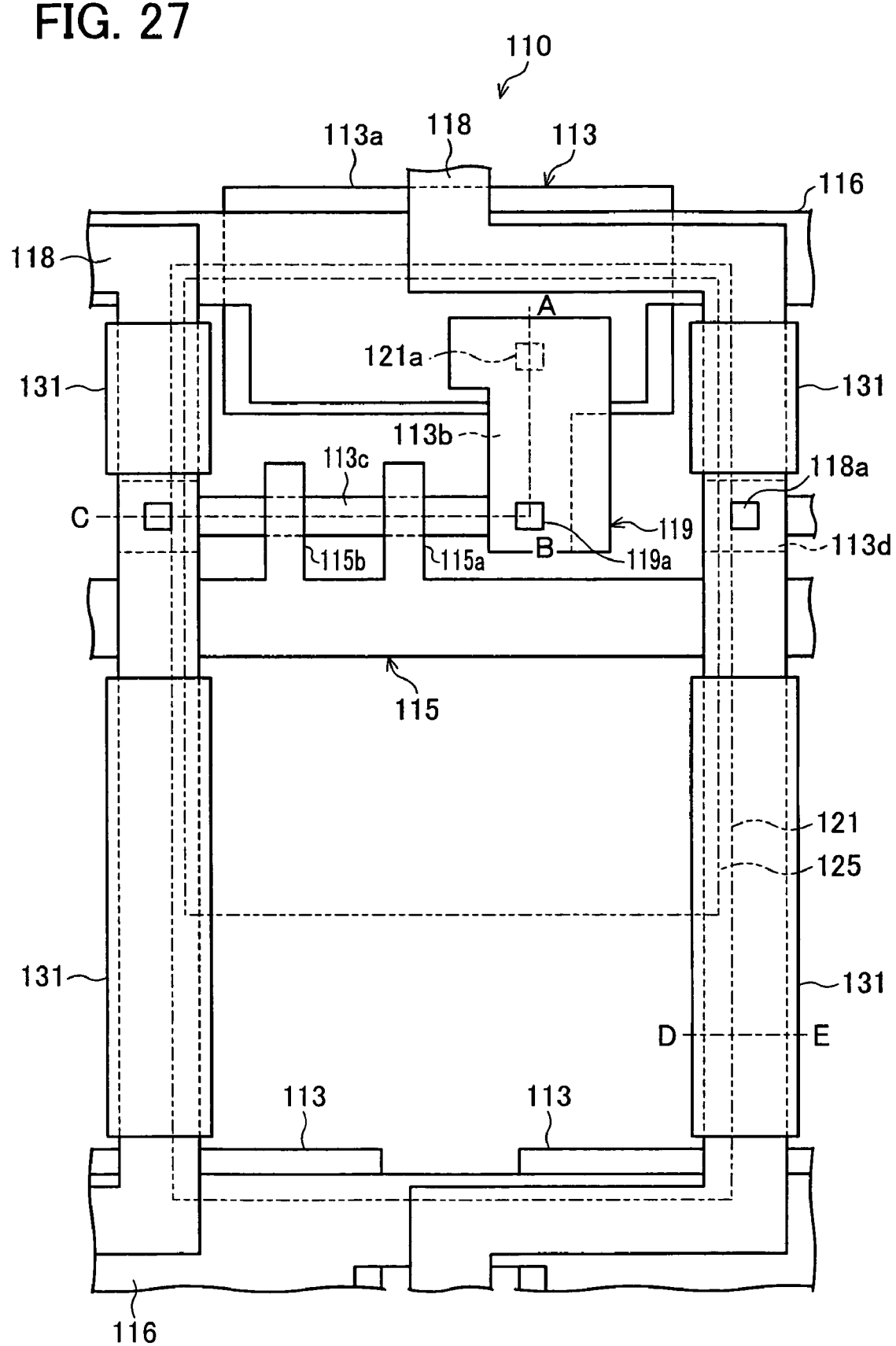
FIG. 27 is a plan view illustrating an arrangement example of the display panel of the liquid crystal display device in accordance with the present invention, where the shield electrode is made of an arbitrary material, and is provided in a floating position.
Figure 28:
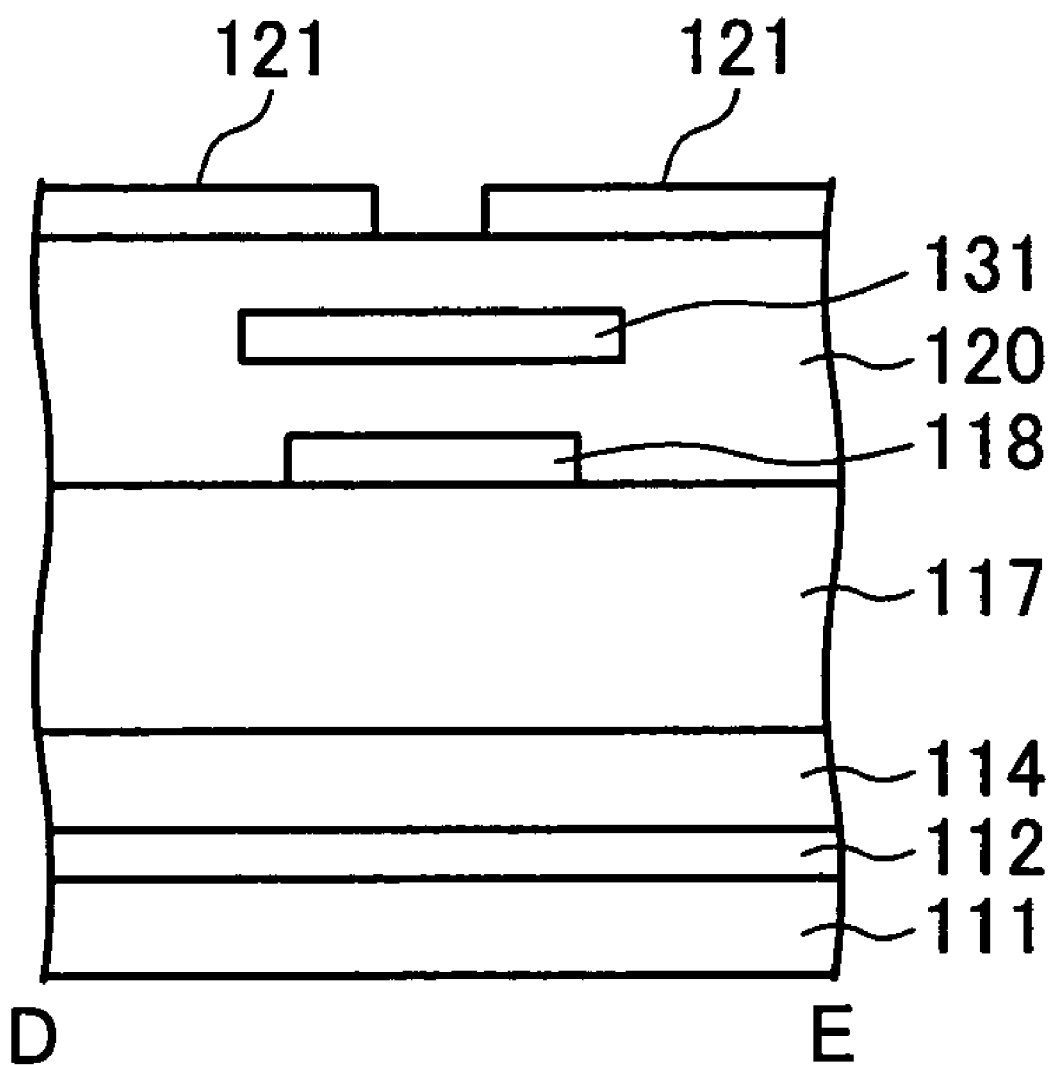
FIG. 28 is a cross-sectional view illustrating an arrangement example of the display panel of the liquid crystal display device in accordance with the present invention, where the shield electrode is made of an arbitrary material.

In the present embodiment, as shown in FIGS. 27 and 28, the shield electrode 131 is provided between the source bus line 118 and the pixel electrode 121. Therefore, the shield electrode 131 has a greater effect of shutting off an electric field generated between the source bus line 118 and the pixel electrode 121. As a result, it is possible to reduce the capacitance between the source bus line 118 and the pixel electrode 121 more saliently.

In order to form such a shield electrode 131, the formation of the resin layer 120 in the foregoing manufacturing process may be divided into a first half and a second half, and the material of the shield electrode 131 may be laminated between the first half and the second half.

Figure 29:
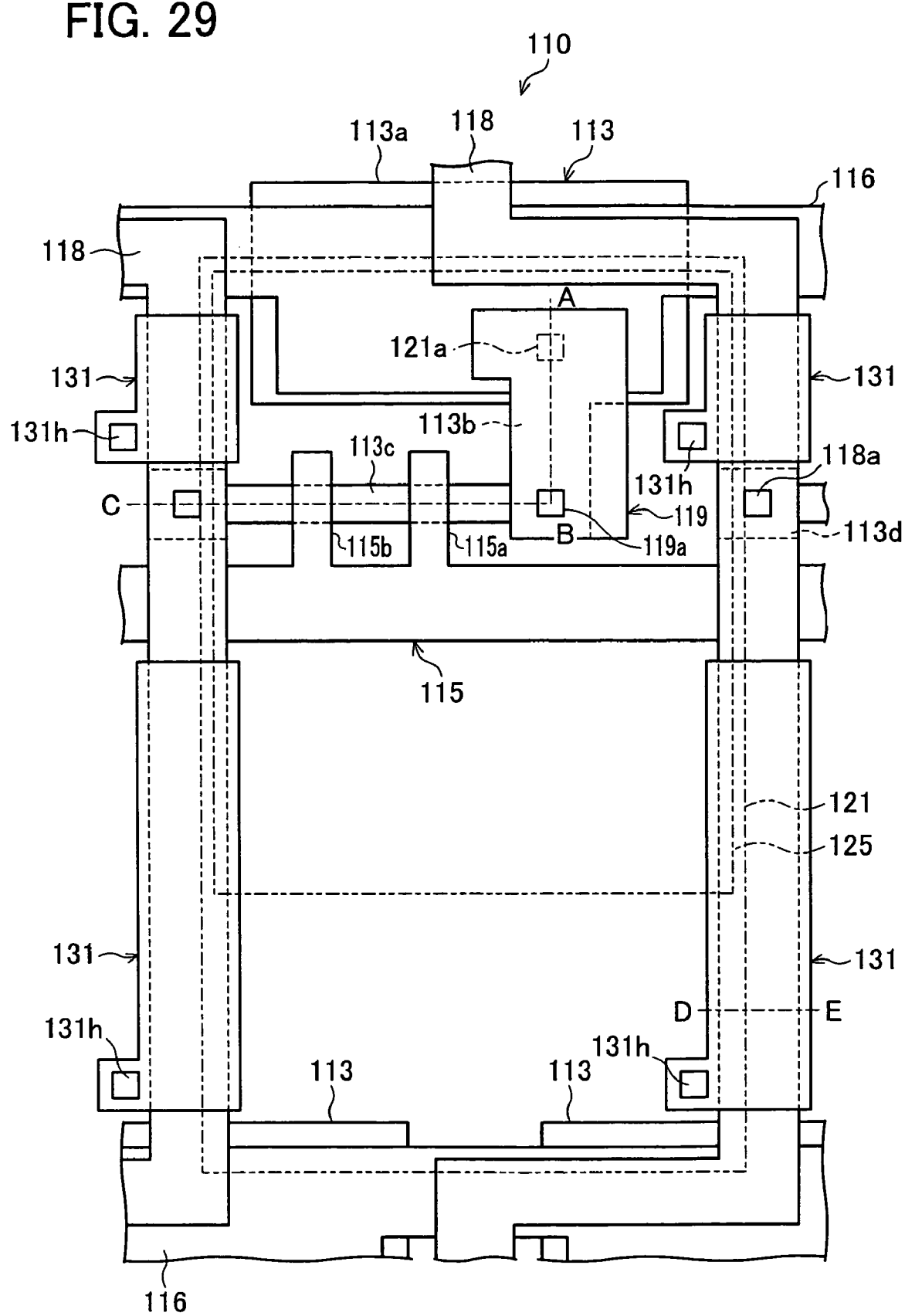
FIG. 29 is a plan view illustrating an arrangement example of the display panel of the liquid crystal display device in accordance with the present invention, where the shield electrode is made of an arbitrary material, and is connected to an arbitrary electrode other than the source bus line.

The shield electrode 131 may be provided in a floating position, or, as in the case of FIG. 21, the shield electrode 131 may be connected to an arbitrary line (including an electrode) other than the source bus line 118, as shown in FIG. 29.

The rest of the manufacturing process is omitted, because it is the same as the manufacturing process described with reference to FIGS. 17 to 19.

[Embodiment 8]

Figure 30:
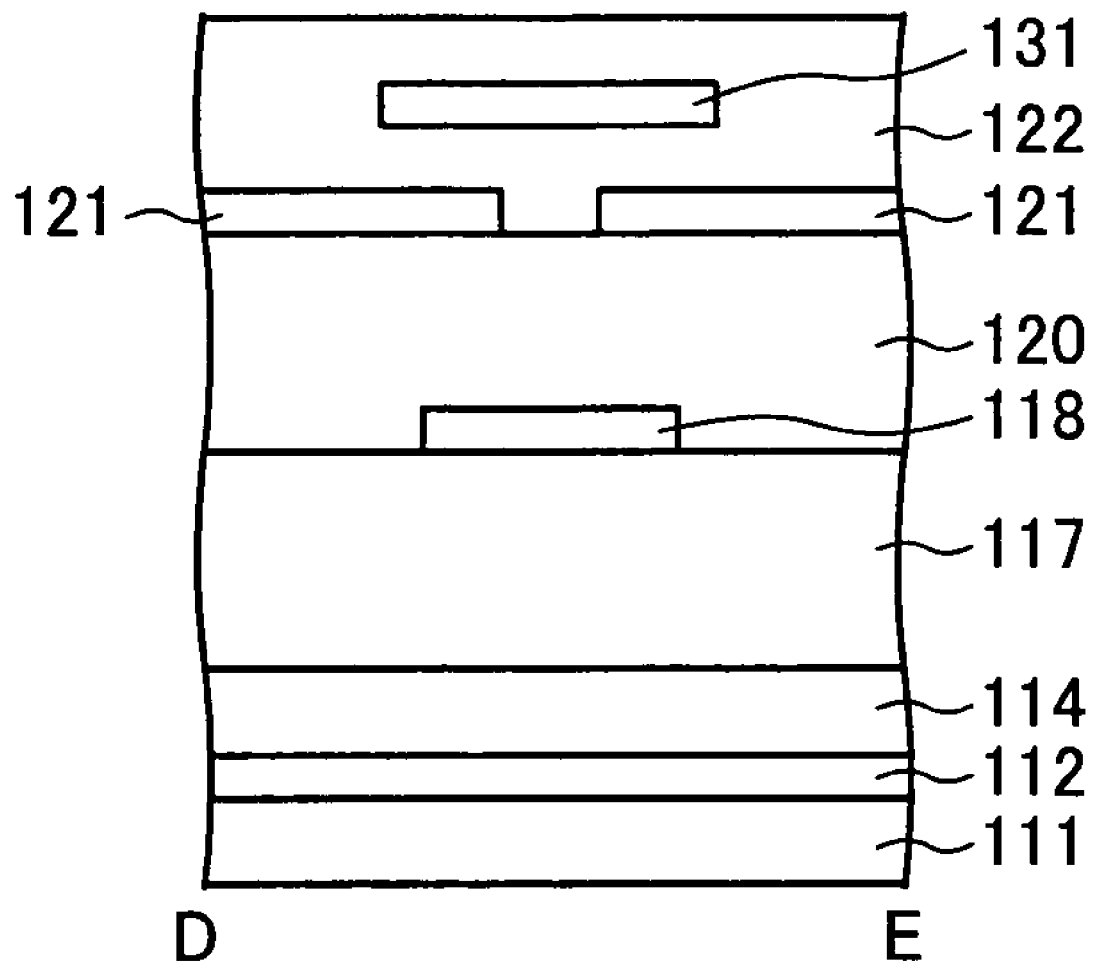
FIG. 30 is a cross-sectional view illustrating an arrangement example of the display panel of the liquid crystal display device in accordance with the present invention, where the shield electrode is made of an arbitrary material.

In the present embodiment, as shown in FIGS. 27 and 30, the shield electrode 131 is provided so as to face one side of the pixel electrode 121, and the source bus line 118 is provided so as to face the other side of the pixel electrode 121. Therefore, it is not necessary to provide a shield electrode to the other side of the pixel electrode 121. As a result, it is possible to increase design freedom concerning the other side of the pixel electrode 121.

In order to form such a shield electrode 131, the formation of the resin layer 122 performed after the formation of the pixel electrode 121 in the foregoing manufacturing process may be divided into a first half and a second half, and the material of the shield electrode 131 may be laminated between the first half and the second half.

The shield electrode 131 may be provided in a floating position, or, as in the case of FIG. 21, the shield electrode 131 may be connected to an arbitrary line (including an electrode) other than the source bus line 118.

The rest of the manufacturing process is omitted, because it is the same as the manufacturing process described with reference to FIGS. 17 to 19.

[Embodiment 9]

Figure 31:
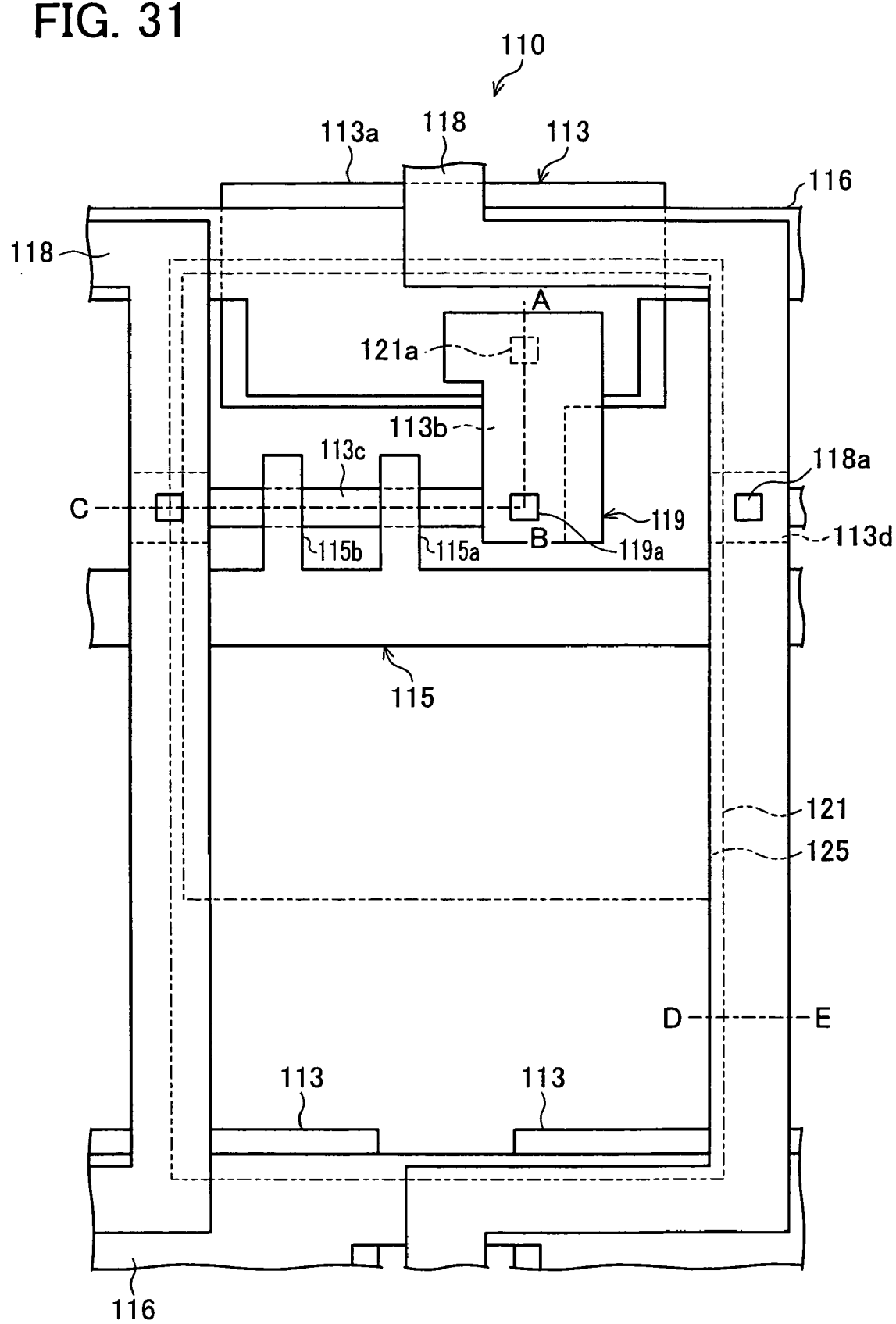
FIG. 31 is a plan view illustrating an arrangement example of the display panel of the liquid crystal display device in accordance with the present invention, where the center of a source bus line is shifted from the center of a distance between pixel electrodes.
Figure 32:
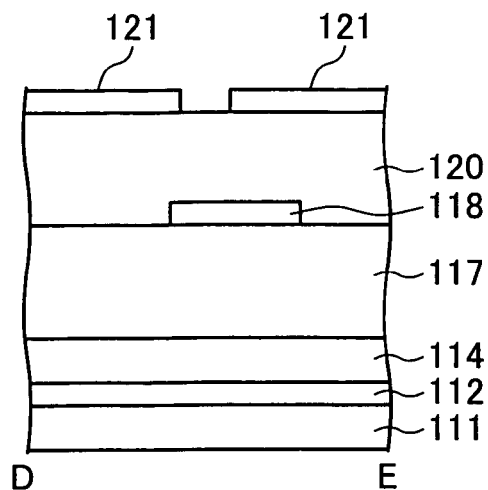
FIG. 32 is a cross-sectional view illustrating an arrangement example of the display panel of the liquid crystal display device in accordance with the present invention, where the center of a source bus line is shifted from the center of a distance between pixel electrodes.

In the present embodiment, as shown in FIGS. 31 and 32, Csd2 is reduced by shifting the position of the source bus line 118 toward the pixel electrode 121 with which Csd1 is to be formed (rightward, in FIG. 32). In EMBODIMENTS 5 to 8, not only Csd2, but also Csd1 are reduced by providing the shield electrode 131. However, as described above, if at least Csd2 can be reduced, it is possible to make the difference in Vpix with respect to each horizontal line smaller, and thereby make a corresponding difference in amount of attracted pixel potential smaller.

More specifically, the display device is arranged so that Csd2 is smaller than Csd1, where Csd 1 is a capacitance formed between one pixel electrode selected arbitrarily from the foregoing colors (e.g. G) and a first source bus line, which applies a data signal to the one pixel electrode, and Csd2 is a capacitance formed between the one pixel electrode and a second source bus line, which is a next source bus line from the first source bus line, provided on an opposite side of the one pixel electrode from the first source bus line.

With this arrangement, it is possible to reduce Csd2 as compared to the case where the capacitances on both sides of the pixel electrode are Csd1. Accordingly, it is possible to reduce the stripes (horizontal stripes) formed by horizontal lines.

To make Csd2 smaller than Csd1, specifically, the display device may be arranged so that S2 is smaller than S1, where S1 is area of overlap between a pixel electrode for one color and a source bus line that applies a data signal to the one color, and S2 is area of overlap between a pixel electrode for another color provided on the same horizontal line as the pixel electrode for one color and the source bus line that applies a data signal to the one color. Note that S2 may be zero.

The display device may be arranged so that the first source bus line applies a data signal to one of the plurality of pixel electrodes, and the second source bus line, which is a next source bus line from the first source bus line, provided on an opposite side of the one of the plurality of pixel electrodes from the first source bus line is such that, in a direction parallel to horizontal lines, length L2 of a portion of the second source bus line that overlaps the one of the plurality of pixel electrodes is shorter than (width of a source bus line–distance between two pixel electrodes)/2.

The first source bus line, which applies a data signal to the one of the plurality of pixel electrodes, is such that, in the direction parallel to horizontal lines, length L1 of a portion of the first source bus line that overlaps the one of the plurality of pixel electrodes is longer than (width of a source bus line—distance between two pixel electrodes)/2.

The length L1 may be length of a portion, which overlaps one pixel electrode (a pixel electrode for one color), of one source bus line (a source bus line that applies a data signal to the one pixel electrode) in the direction parallel to horizontal lines, and the length L2 may be length of a portion, which overlaps another pixel electrode (a pixel electrode, which is for another color, provided on the same horizontal line as the pixel for one color), of the one source bus line in the direction parallel to horizontal lines.

Figure 33:
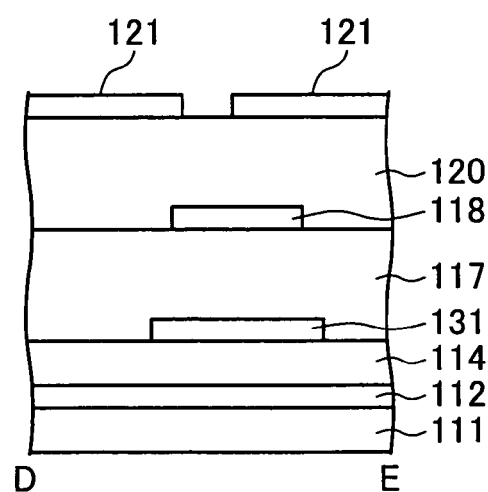
FIG. 33 is a cross-sectional view illustrating an arrangement example of the display panel of the liquid crystal display device in accordance with the present invention, where the center of a source bus line is shifted from the center of a distance between pixel electrodes.

As shown in FIG. 33, the shield electrode 131 of FIG. 19 may be provided while adopting the foregoing arrangement. In this case, as shown in FIG. 33, the shield electrode 131 may be shifted toward the pixel electrode 121 with which Csd1 is to be formed (rightward, in FIG. 33).

Figure 34:
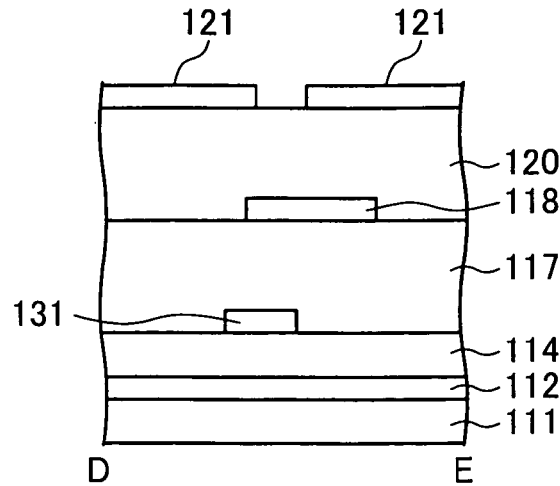
FIG. 34 is a cross-sectional view illustrating an arrangement example of the display panel of the liquid crystal display device in accordance with the present invention, where the center of a source bus line is shifted from the center of a distance between pixel electrodes.

As shown in FIG. 34, a shield electrode similar to the shield electrode 131b of FIG. 25 may be provided while adopting the foregoing arrangement.

Figure 35:
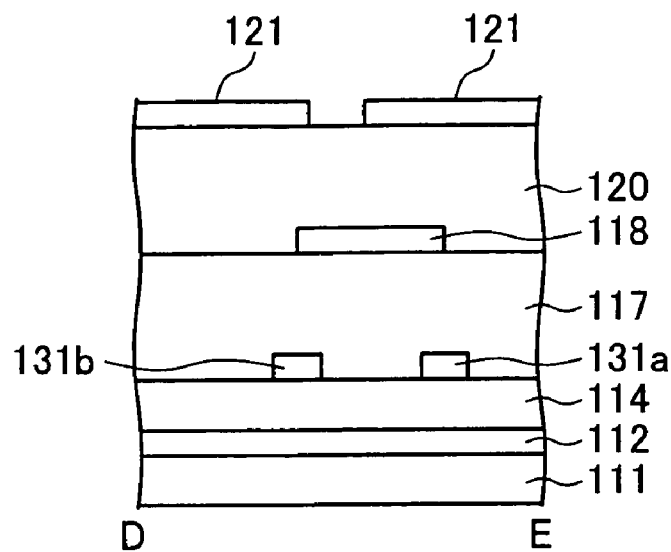
FIG. 35 is a cross-sectional view illustrating an arrangement example of the display panel of the liquid crystal display device in accordance with the present invention, where the center of a source bus line is shifted from the center of a distance between pixel electrodes.

As shown in FIG. 35, the shield electrodes 131a and 131b of FIG. 20 may be provided while adopting the foregoing arrangement. In this case, as shown in FIG. 35, the shield electrodes 131a and 131b may be shifted toward the pixel electrode 121 with which Csd1 is to be formed (rightward, in FIG. 35).

Figure 36:
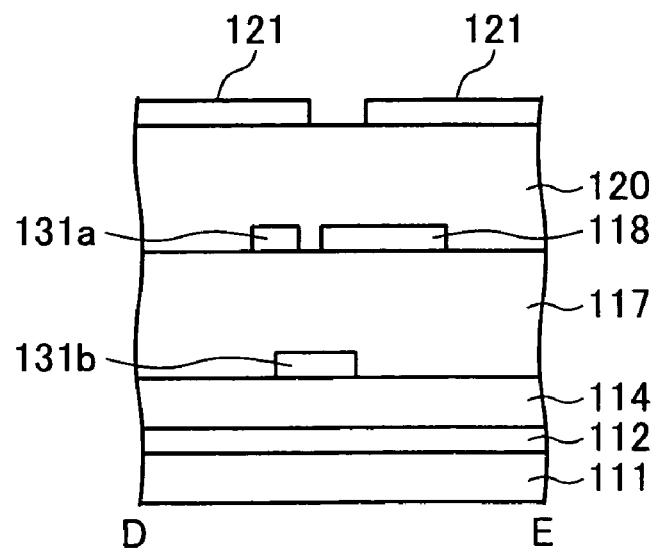
FIG. 36 is a cross-sectional view illustrating an arrangement example of the display panel of the liquid crystal display device in accordance with the present invention, where the center of a source bus line is shifted from the center of a distance between pixel electrodes.
Figure 37:
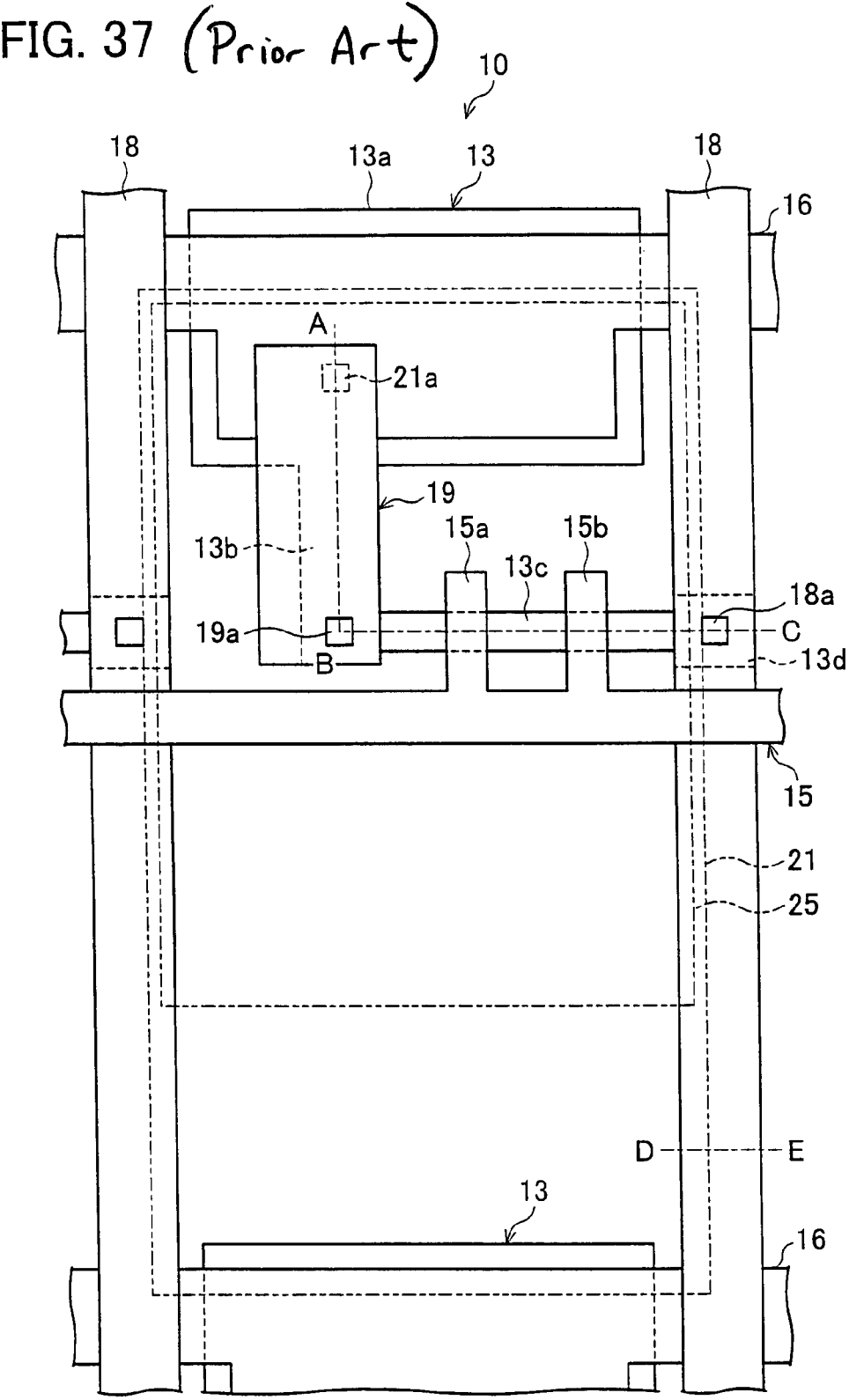
FIG. 37 is a plan view illustrating an arrangement example of a display panel of a conventional liquid crystal display device.

As shown in FIG. 36, the shield electrode 131 of FIG. 24 and the shield electrode 131b of FIG. 25 may be provided as shield electrodes 131a and 131b while adopting the foregoing arrangement. In this case, as shown in FIG. 36, the source bus line 118 may be provided so as not to overlap the pixel electrode 121 with which Csd2 is to be formed (the pixel electrode on the left, in FIG. 36).

A display device of the present invention may be a display device including: a gate bus line; a source bus line; a pixel electrode, which is provided within a region surrounded by the gate bus line and the source bus line, for receiving a data signal of one color from the source bus line; and a shield electrode, which is provided so as not to touch a source bus line that does not apply a data signal to the pixel electrode and so as not to touch the pixel electrode, for reducing a capacitance between the source bus line and the pixel electrode.

According to this arrangement, a shield electrode is provided so as not to touch a source bus line that does not apply a data signal to the pixel electrode and so as not to touch the pixel electrode, for reducing a capacitance between the source bus line and the pixel electrode. That is, the shield electrode functions to shut off the electric field between the source bus line and the pixel electrode. As a result, it is possible to reduce a capacitance between (i) a pixel electrode for another color provided on the same horizontal line as the pixel electrode for one color and (ii) the source bus line. The capacitance between the source bus line for one color and the pixel electrode is constant, regardless of the horizontal line. Therefore, it is possible to make the difference, with respect to each horizontal line, in the amount of pixel potential attracted by the source bus line smaller. As a result, it is possible to prevent the difference, with respect to each horizontal line, in the amount of pixel potential attracted by the source bus line from appearing as a difference in luminance (=horizontal stripes) with respect to each horizontal line, and thereby attain even display.

A display device of the present invention may be a display device including: a gate bus line; a source bus line; a pixel electrode, which is provided within a region surrounded by the gate bus line and the source bus line, for receiving a data signal of one color from the source bus line, wherein S2 (which may be zero) is smaller than S1, where S1 is area of overlap between a pixel electrode for one color and a source bus line that applies a data signal to the pixel electrode for one color, and S2 is area of overlap between a pixel electrode for another color provided on the same horizontal line as the pixel electrode for one color and the source bus line that applies a data signal to the pixel electrode for one color.

With this arrangement, it is possible to reduce a capacitance between (i) a pixel electrode for another color provided on the same horizontal line as the pixel electrode for one color and (ii) the source bus line. The capacitance between the source bus line for one color and the pixel electrode is constant, regardless of the horizontal line. Therefore, it is possible to make the difference, with respect to each horizontal line, in the amount of pixel potential attracted by the source bus line smaller. As a result, it is possible to prevent the difference, with respect to each horizontal line, in the amount of pixel potential attracted by the source bus line from appearing as a difference in luminance (=horizontal stripes) with respect to each horizontal line, and thereby attain even display.

A display device of the present invention may be a display device including: a gate bus line; a source bus line; a pixel electrode, which is provided within a region surrounded by the gate bus line and the source bus line, for receiving a data signal of one color from the source bus line, wherein, one source bus line applying a data signal to a pixel electrode for one color, L1 being length, in a direction parallel to horizontal lines, of a portion of the one source bus line that overlaps the pixel electrode for one color, L2 being length, in the direction parallel to horizontal lines, of a portion of the one source bus line that overlaps a pixel electrode for another color provided on the same horizontal line as the pixel electrode for one color, L2 is shorter than (width of a source bus line–distance between two pixel electrodes)/2.

With this arrangement, it is possible to reduce a capacitance between (i) a pixel electrode for another color provided on the same horizontal line as the pixel electrode for one color and (ii) the source bus line. The capacitance between the source bus line for one color and the pixel electrode is constant, regardless of the horizontal line. Therefore, it is possible to make the difference, with respect to each horizontal line, in the amount of pixel potential attracted by the source bus line smaller. As a result, it is possible to prevent the difference, with respect to each horizontal line, in the amount of pixel potential attracted by the source bus line from appearing as a difference in luminance (=horizontal stripes) with respect to each horizontal line, and thereby attain even display.

The display device of the present invention may be such that, in a delta arrangement, the shield electrode overlaps at least the source bus line with which Csd2 is to be formed, out of the source bus line with which Csd1 is to be formed and the source bus line with which Csd2 is to be formed.

The display device of the present invention may be such that, in a delta arrangement, length of such a portion where at least one pixel electrode and a source bus line are opposed to each other in a cross section, taken along a direction parallel to horizontal lines, of a source bus line which is provided around a pixel electrode and forms Csd2 is shorter than (width of a source bus line–distance between a pixel electrode that forms Csd1 and a pixel electrode that forms Csd2)/2.

A display device of the present invention may be a display device including a gate bus line, a source bus line, an auxiliary capacitance line, a thin-film transistor provided in the vicinity of an intersection of the gate bus line and the source bus line within a region surrounded by the gate bus line and the source bus line, a pixel electrode connected to the transistor, and an opposed electrode opposed to the pixel electrode, wherein: a right-to-left balance of the source bus line is changed so as to reduce, out of source-drain parasitic capacitances, a source-drain parasitic capacitance (Csd2) to be formed with a source bus line that does not drive the pixel electrode.

The position of the source bus line is thus shifted to the Csd1-side, so as to reduce the area of overlap with the pixel electrode.

A display device of the present invention may be a display device including a gate bus line, a source bus line, an auxiliary capacitance line, a thin-film transistor provided in the vicinity of an intersection of the gate bus line and the source bus line within a region surrounded by the gate bus line and the source bus line, a pixel electrode connected to the transistor, and an opposed electrode opposed to the pixel electrode, further including: a shield electrode in the vicinity of the source bus line, so as to reduce a capacitance between a source bus line-drain capacitance (Csd).

Thus, another electrode is provided in the vicinity of the source bus line, so as to shut off the electric field.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

What is claimed is:

1. A display device, comprising:
a plurality of source bus lines each of which has a continuous S-bend shape and is provided with concave regions and convex regions at each side alternately;
an insulating film covering the plurality of source bus lines; and
a plurality of pixel electrodes each of which is provided in a concave region at least partially, wherein each of the source bus lines applies a data signal(s) only to a pixel electrode(s) opposed to the convex region(s) at every one of the plurality of pixel electrodes;
wherein each two of the source bus lines sandwiching said each one of the pixel electrodes functions to said each one of the pixel electrodes as a first source bus line and a second source bus line respectively;
wherein capacitances formed between said each one of the plurality of pixel electrodes and said source bus lines are set in such a manner that a relationship that Csd2 is smaller than Csd1 is satisfied at said every one of the plurality of pixel electrodes, where Csd1 is a capacitance formed between said each one of the plurality of pixel electrodes and the first source bus line, which applies a data signal to said each one of the plurality of pixel electrodes, and Csd2 is a capacitance formed between said each one of the plurality of pixel electrodes and the second source bus line which does not apply a data signal to said each one of the plurality of pixel electrodes and which is a next source bus line from the first source bus line, provided to an opposite side of said one of the plurality of pixel electrodes from the first source bus line.

2. A display device, comprising:
a plurality of source bus lines each of which has a continuous S-bend shape and is provided with concave regions and convex regions at each side alternately;
an insulating film covering the plurality of source bus lines; and
a plurality of pixel electrodes each of which is provided in a concave region at least partially, wherein each of the source bus lines applies data signals only to pixel electrodes opposed to the convex regions at said every one of the plurality of pixel electrodes;
wherein each two of the source bus lines sandwiching said each one of the pixel electrodes functions to said each one of the pixel electrodes as a first source bus line and a second source bus line respectively,
the first source bus line applying a data signal to said each one of the plurality of pixel electrodes, and the second source bus line which does not apply a data signal to said each one of the plurality of pixel electrodes and which is a next source bus line from the first source bus line, provided on an opposite side of said one of the plurality of pixel electrodes from the first source bus line being such that, in a direction parallel to horizontal lines, a relationship that length L2 of a portion of the second source bus line that overlaps said one of the plurality of pixel electrodes is shorter than length M which is (width of a source bus line—distance between two pixel electrodes)/2 is satisfied at said every one of the plurality of pixel electrodes.

3. The display device as set forth in claim 1, wherein: each of the plurality of source bus lines is used exclusively for pixels of one color.

4. The display device as set forth in claim 2, wherein: each of the plurality of source bus lines is used exclusively for pixels of one color.

5. The display device of claim 1, wherein Csd1 is substantially constant in all horizontal lines.

6. The display device of claim 1, wherein S2 is smaller than S1, wherein S1 is area of overlap between one pixel electrode for one color and the source bus line that applies the data signal to the one color, and S2 is area of overlap between one pixel electrode for another color provided on a same horizontal line as the pixel electrode for one color and the source bus line that applies the data signal to the one color.

7. The display device of claim 6, wherein capacitance between one pixel electrode for one color and the source bus line for one color is constant in all horizontal lines.

8. The display device of claim 7, wherein S1 is constant in all horizontal lines.

9. The display device of claim 2, wherein the first source bus line, which applies a data signal to the one of the plurality of pixel electrodes, is arranged so that in the direction parallel to the horizontal lines, length L1 of a portion of the first source bus line that overlaps the one of the plurality of pixel electrodes is longer than (width of a source bus line —distance between two pixel electrodes)/2.

10. The display device of claim 9, wherein L1 is constant in all horizontal lines.

11. The display device of claim 1, further comprising a liquid crystal display element, wherein the relationship of Csd1 and Csd2 does not depend on orientation direction of liquid crystal, which is rubbing direction.

12. The display device of claim 1, wherein Vpix is a potential of a pixel electrode after attraction of a potential from the pixel electrode to the source bus line that does not drive the pixel electrode, due to a parasitic capacitance between the pixel electrode and the source bus line,
    wherein a pixel electrode column is a group of pixel electrodes which receive a data signal from a same source bus line, and
    wherein, at every of a plurality of pixel electrode columns, a difference in Vpix's among the pixel electrodes in the pixel electrode column is smaller compared with a case where Csd1 and Csd2 do not satisfy said relationship.

13. The display device of claim 2, further comprising a liquid crystal display element, wherein the relationship of Csd1 and Csd2 does not depend on orientation direction of liquid crystal, which is rubbing direction.

14. The display device of claim 2, wherein Vpix is a potential of a pixel electrode after attraction of a potential from the pixel electrode to the source bus line that does not drive the pixel electrode, due to a parasitic capacitance between the pixel electrode and the source bus line,
    wherein a pixel electrode column is a group of pixel electrodes which receive a data signal from a same source bus line, and
    wherein, at every of a plurality of pixel electrode columns, a difference in Vpix's among the pixel electrodes in the pixel electrode column is smaller compared with a case where Csd1 and Csd2 do not satisfy said relationship.

* * * * *